US011223802B2

(12) United States Patent
Ohmura et al.

(10) Patent No.: US 11,223,802 B2
(45) Date of Patent: Jan. 11, 2022

(54) IMAGE-BASED DETERMINATION APPARATUS AND IMAGE-BASED DETERMINATION SYSTEM

(71) Applicant: Ricoh Company, Ltd., Tokyo (JP)

(72) Inventors: Keiji Ohmura, Kanagawa (JP); Shotaro Komoto, Kanagawa (JP); Akito Tajima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/929,162

(22) Filed: Jul. 15, 2020

(65) Prior Publication Data

US 2021/0037213 A1    Feb. 4, 2021

(30) Foreign Application Priority Data

Jul. 31, 2019  (JP) .............................. JP2019-141802
Jun. 18, 2020  (JP) .............................. JP2020-105414

(51) Int. Cl.
*H04N 5/77*   (2006.01)
*H04N 7/18*   (2006.01)
*G11B 27/10*  (2006.01)
*H04N 9/64*   (2006.01)

(52) U.S. Cl.
CPC ........... *H04N 7/181* (2013.01); *G11B 27/102* (2013.01); *H04N 9/64* (2013.01)

(58) Field of Classification Search
CPC ......... H04N 7/181; H04N 9/64; G11B 27/102
USPC ........ 386/223, 224, 228, 227, 230, 248, 326
See application file for complete search history.

(56) References Cited

U.S. PATENT DOCUMENTS

| 2012/0062940 | A1* | 3/2012 | Masutani ................ G06T 11/60 358/1.15 |
| 2013/0063547 | A1 | 3/2013 | Kasuya et al. |
| 2014/0375818 | A1 | 12/2014 | Lee et al. |
| 2015/0130946 | A1 | 5/2015 | Omura et al. |
| 2016/0034784 | A1 | 2/2016 | Ohmura et al. |

(Continued)

FOREIGN PATENT DOCUMENTS

EP   3 255 884 A1   12/2017
JP   2016-018571    2/2016

OTHER PUBLICATIONS

Partial European Search Report dated Sep. 29, 2020 in European Patent Application No. 20187931.9, 14 pages.

*Primary Examiner* — Robert Chevalier
(74) *Attorney, Agent, or Firm* — Xsensus LLP

(57) ABSTRACT

An image-based determination apparatus includes circuitry configured to receive at least one of first image data, output from image capture apparatuses, and second image data, output from another device, the first image data and the second image data to be subjected to an image-based determination operation; play and display the at least one of the received first image data and the second image data, on a display; designate a detection area, to be subjected to the image-based determination operation, in a first display area being displayed on the display, the first display area displaying the at least one of the first image data and the second image data; and perform the image-based determination operation on an image at the detection area in a second display area being displayed on the display, the second display area displaying the at least one of the first image data and the second image data.

12 Claims, 22 Drawing Sheets

(56) References Cited

U.S. PATENT DOCUMENTS

| | | |
|---|---|---|
| 2017/0311037 A1 | 10/2017 | Ohmura et al. |
| 2017/0359546 A1 | 12/2017 | Ohmura et al. |
| 2018/0301171 A1 | 10/2018 | Yamana et al. |
| 2018/0374221 A1 | 12/2018 | Komoto et al. |
| 2019/0043336 A1 | 2/2019 | Ikeda et al. |
| 2020/0103286 A1 | 4/2020 | Ikeda et al. |
| 2020/0135002 A1 | 4/2020 | Ikeda et al. |

\* cited by examiner

IMAGE-BASED DETERMINATION APPARATUS AND IMAGE-BASED DETERMINATION SYSTEM

CROSS-REFERENCE TO RELATED APPLICATION

This application claims priority pursuant to 35 U.S.C. § 119(a) to Japanese Patent Application Nos. 2019-141802, filed on Jul. 31, 2019 and 2020-105414, filed on Jun. 18, 2020 in the Japan Patent Office, the disclosure of which is incorporated by reference herein in its entirety.

BACKGROUND

Technical Field

This disclosure relates to an image-based determination apparatus, and an image-based determination system.

Background Art

Image-based determination systems have been used to analyze image data acquired and recorded using image capture apparatuses, such as video cameras to detect objects and/or determine motion or abnormality of objects on the image data. For example, the image-based determination systems have been applied to production lines of products.

For example, an image monitoring system, which determines motion or abnormality of objects based on image data, includes an image extraction unit, a list generation unit, and a play control unit. The image extraction unit extracts images from monitored target images obtained by capturing images of monitored target objects based on conditions set by a user, such as working area and/or working time. The list generation unit associates marks, associated with specific events set by the user condition such as the working area, working time, or work content of the worker, with the images extracted by the image extraction unit, and generates a list and store the list in a storage device. The play control unit reads out the list stored in the storage device and displays the list on a display, and when the mark is selected from the list displayed on the display, the play control unit identifies an image associated with the mark, and plays and displays the identified image on the display.

However, the above mentioned technology uses image capture apparatuses, such as internet protocol (IP) cameras (network cameras) alone, as devices connected to the image-based determination apparatuses, in which the image-based determination operation of image data is performed only for the image data captured by the image capture apparatuses.

SUMMARY

As one aspect of the present disclosure, an image-based determination apparatus is devised. The image-based determination apparatus includes circuitry configured to receive at least one of first image data, output from one or more image capture apparatuses, and second image data, output from another device, the first image data and the second image data to be subjected to an image-based determination operation; play and display the at least one of the received first image data and the second image data, on a display; designate a detection area, to be subjected to the image-based determination operation, in a first display area being displayed on the display, the first display area configured to display the at least one of the first image data and the second image data; and perform the image-based determination operation on an image at the detection area in a second display area being displayed on the display, the second display area configured to display the at least one of the first image data and the second image data.

As another aspect of the present disclosure, an image-based determination system is devised. The image-based determination system includes one or more image capture apparatuses configured to output first image data to be subjected to an image-based determination operation; another device configured to output second image data to be subjected to the image-based determination operation; and an image-based determination apparatus configured to perform the image-based determination operation on at least one of the first image data and the second image data The image-based determination apparatus includes circuitry configured to receive the at least one of the first image data, output from the one or more image capture apparatuses, and the second image data, output from the another device; play and display the at least one of the received first image data and the second image data, on a display; designate a detection area, to be subjected to the image-based determination operation, in a first display area being displayed on the display, the first display area configured to display the at least one of the first image data and the second image data; and perform the image-based determination operation on an image at the detection area in a second display area being displayed on the display, the second display area configured to display the at least one of the first image data and the second image data.

BRIEF DESCRIPTION OF THE DRAWINGS

A more complete appreciation of the description and many of the attendant advantages and features thereof can be readily acquired and understood from the following detailed description with reference to the accompanying drawings, wherein.

The accompanying drawings are intended to depict embodiments of the this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an image-based determination apparatus and an image-based determination system according to one or more embodiments with reference to accompanying drawings. Further, the following embodiments are not limited to this disclosure, and the components in the following embodiments may include those implemented by the skilled in the art, substantially identical, and in equivalent range. Further, various omissions, substitutions, modifications, and combinations of components can be made without departing from the scope of the embodiments described in this description.

(Configuration of Image-Based Determination System)

Figure 1:
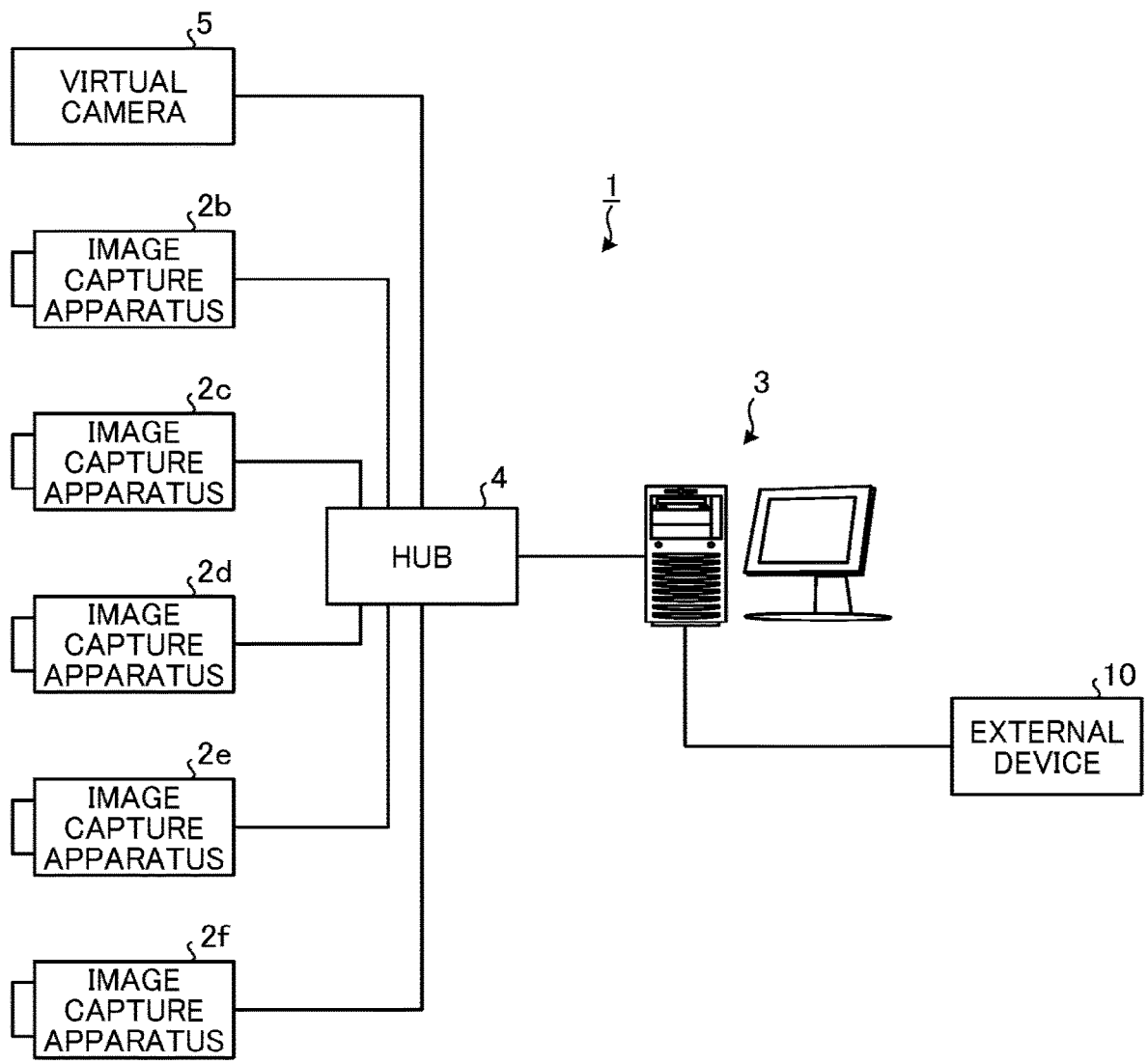
FIG. 1 is an example of schematic configuration of an image-based determination system according to an embodiment.

FIG. 1 is an example of schematic configuration of an image-based determination system 1 according to an embodiment. Hereinafter, with reference to FIG. 1, a description is given of a schematic configuration of the image-based determination system 1 according to the embodiment.

As illustrated in FIG. 1, the image-based determination system 1 includes, for example, image capture apparatuses 2b, 2c, 2d, 2e, and 2f (hereinafter, image capture apparatuses 2b to 2f), a virtual camera 5, a hub 4, and an information processing apparatus 3.

Each of the image capture apparatuses 2b to 2f is, for example, an internet protocol (IP) camera (network camera) that receives light from an object, converts the light into electric signals to capture an image of the object, and generates movie image composed of a plurality of frames, such as 10 frames per second (FPS), as the image data, which is referred to as the first image data in this description. For example, each of the image capture apparatuses 2b to 2f captures images of production facilities or production lines used for manufacturing products, and generates image data used for detecting abnormality of works, such as work products, and/or for determining errors of work processing performed by workers.

Further, the image capture apparatuses 2b to 2f may be collectively referred to as the image capture apparatus 2 in this description when not distinguishing the image capture apparatuses 2b to 2f. Further, in an example case of FIG. 1, the image-based determination system 1 includes the image capture apparatuses 2 with five, but is not limited thereto. For example, the image-based determination system 1 includes any number of the image capture apparatuses 2.

In this description, different from the image capture apparatuses 2b to 2f that output the captured image data directly to the information processing apparatus 3, the virtual camera 5 represents a device, such as a device and system that can output image data, such as movie image, captured image, and generated image to be used as target data used for determining abnormality or the like. In the embodiment and modification examples described in this description, the image data output from the virtual camera 5 is referred to as the second image data. In the embodiment and modification examples described in this description, to be described later, the virtual camera 5 is assumed to be another image-based determination system having a configuration compatible to the image-based determination system 1. The virtual camera 5 corresponds to "another device (additional device)" in this description.

Further, in an example case of FIG. 1, the image-based determination system 1 includes the virtual camera 5 with one, but is not limited thereto. For example, the image-based determination system 1 can include the virtual camera 5 with any number. Further, in this description, the image data is described as the movie image composed of a plurality of frames, but is not limited thereto. The image data may include still image composed of one frame. Further, in this description, the image data output from the image capture device 2b to 2f is referred to as the first image data, and the image data output from the virtual camera 5 is referred to as the second image data to distinguish an output source of the image data, in which the image capture apparatuses 2b to 2f may be referred to as the first output source of the image data, and the virtual camera 5 may be referred to as the second output source of the image data.

The hub 4 is a switching hub, for example, corresponding to Ethernet (registered trademark) standard, to configure a local area network (LAN) by connecting the image capture apparatuses 2b to 2f, the virtual camera 5, and the information processing apparatus 3. Since the image capture apparatuses 2b to 2f, the virtual camera 5, and the information processing apparatus 3 are respectively set with an internet protocol (IP) address (and a media access control (MAC) address), the image capture apparatuses 2b to 2f, the virtual camera 5, and the information processing apparatus 3 can be configured as one LAN system via the hub 4 used as the switching hub. In this case, data communication is performed using a protocol, such as transmission control protocol (TCP)/internet protocol (IP) on the LAN.

The information processing apparatus 3, such as personal computer (PC) or workstation, is used as an image-based determination apparatus that performs image-based determination operation based on the image data (first image data) output from the image capture apparatus 2, and the image data (second image data) output from the virtual camera 5, such as movie image. Further, the information processing apparatus 3 is connected to an external device 10, such as production facilities, to communicate data using, for example, a field bus. The field bus employs a communication standard, for example, process field bus (Profibus) used in Europe or CC-Link (registered trademark) of Mitsubishi Electric Co., Ltd.

Further, as to the LAN illustrated in FIG. 1, the communication uses transmission control protocol/internet protocol (TCP/IP), but is not limited thereto. For example, the information processing apparatus 3 may have a plurality of video graphics array (VGA) terminals or a plurality of universal serial bus (USB) ports, and a plurality of image capture apparatuses 2 and the virtual camera 5 may be connected to the information processing apparatus 3 via VGA cable or USB cable.

(Hardware Configuration of Information Processing Apparatus)

Figure 2:
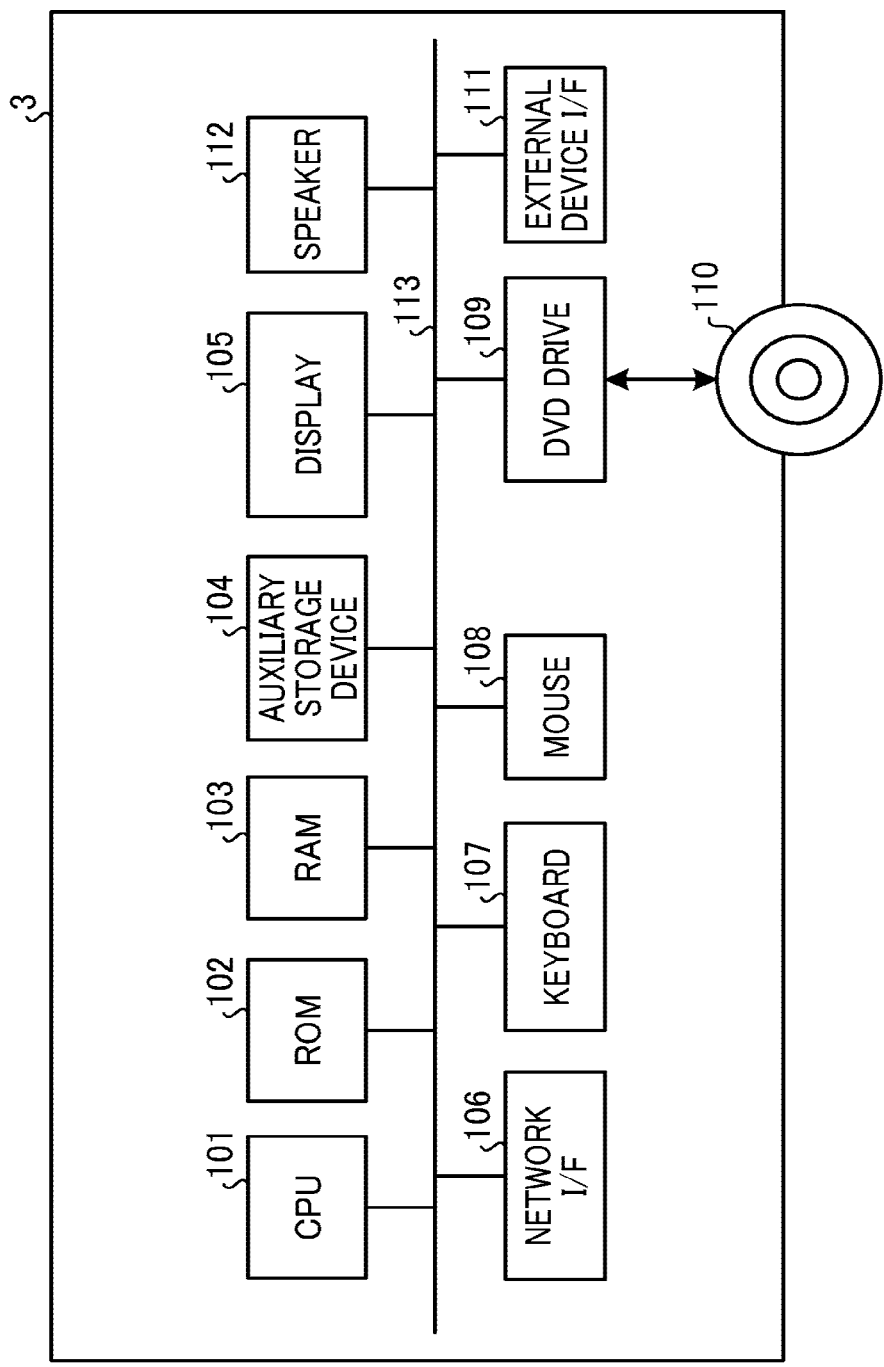
FIG. 2 is an example of configuration of hardware block diagram of an information processing apparatus according to the embodiment.

FIG. 2 is an example of configuration of hardware block diagram of the information processing apparatus 3 according to the embodiment. Hereinafter, with reference to FIG. 2, a description is given of hardware block diagram of the information processing apparatus 3.

As illustrated in FIG. 2, the information processing apparatus 3 includes, for example, a central processing unit (CPU) 101, a read only memory (ROM) 102, a random access memory (RAM) 103, an auxiliary storage device 104, a display 105 (display device), a network interface (I/F) 106, a keyboard 107 (an example of input unit), a mouse 108 (an example of input unit), a digital versatile disc (DVD) drive 109, an external device interface (I/F) 111, and a speaker 112.

The CPU 101 is a device for controlling the operation of the information processing apparatus 3 entirely. The ROM 102 is a non-volatile storage device that stores programs and basic input/output system (BIOS) for the information processing apparatus 3. The RAM 103 is a volatile storage device used as a work area of the CPU 101.

The auxiliary storage device 104 is a storage device, such as hard disk drive (HDD) or solid state drive (SSD), that stores various data, such as image data (first image data) output from the image capture apparatus 2, image data (second image data) output by the virtual camera 5, such as movie image, and setting information.

The display 105 displays various information, such as cursor, menu, window, text, image, and a screen of application that performs the image-based determination operation using the information processing apparatus 3. The display 105 is, for example, cathode ray tube (CRT) display, liquid crystal display (LCD), or organic electroluminescence (OEL) display. Further, for example, the display 105 can be connected to a main unit of the information processing apparatus 3 using, for example, VGA cable, high-definition multimedia interface (HDMI) cable, or Ethernet (registered trademark) cable.

The network I/F 106 is an interface connected to the hub 4 to communicate data. The network I/F 106 is, for example, network interface card (NIC) that can communicate data using TCP/IP protocol. Specifically, the information processing apparatus 3 acquires image data from the image capture apparatus 2 and the virtual camera 5 via the hub 4 and the network I/F 106. Further, the network IN 106 may be wireless I/F conforming to given communication standard, such as Wi-Fi (registered trademark).

The keyboard 107 is an example of input unit used for inputting characters, numerals, various instructions, moving a cursor, and setting the setting information, or the like. The mouse 108 is an example of input unit used for selecting and executing various instructions, selecting a process target, moving a cursor, and setting the setting information, or the like The DVD drive 109 controls reading and writing of various data from and to DVD 110, which is an example of a removable recording medium. Further, the recording medium used for reading or writing data by the DVD drive 109 is not limited to DVD. For example, the recording medium can be compact disc-read only memory (CD-ROM), compact disc-recordable (CD-R), DVD recordable (DVD-R), DVD re-writable (DVD-RW), or Blu-ray Disc, or the like.

The external device I/F 111 is an interface connected to the external device 10 to communicate data. The external device I/F 111 is an interface, for example, that can communicate data using a field bus. Specifically, the information processing apparatus 3 performs data communication with the external device 10 via the external device I/F 111.

The speaker 112 is a device that outputs audio or sound in accordance with an operation of application.

The CPU 101, ROM 102, RAM 103, auxiliary storage device 104, display 105, network I/F 106, keyboard 107, mouse 108, DVD drive 109, external device I/F 111, and speaker 112 are communicatively connected each other by a bus 113, such as address bus and data bus. Further, if the display 105 is connected using Ethernet cable, the display 105 is connected to the network I/F 106, in which data communication is performed using protocol, such as TCP/IP.

(Functional Configuration of Information Processing Apparatus)

Figure 3:
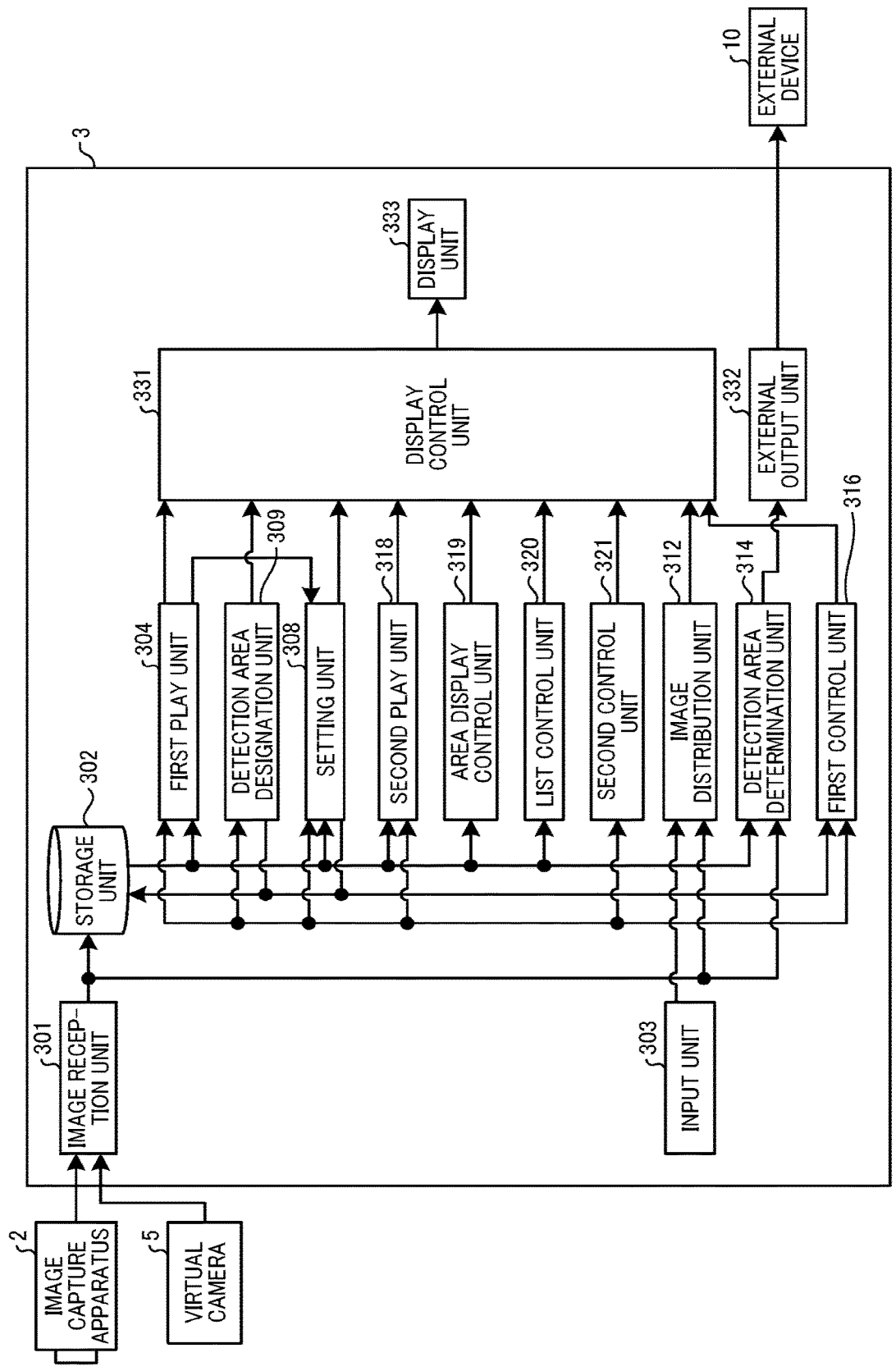
FIG. 3 is an example of configuration of functional block diagram of the information processing apparatus according to the embodiment.

FIG. 3 is an example of configuration of functional block diagram of the information processing apparatus 3 according to the embodiment. Hereinafter, with reference to FIG. 3, a description is given of functional block diagram of the information processing apparatus 3.

As illustrated in FIG. 3, the information processing apparatus 3 includes, for example, an image reception unit 301 (reception unit), a storage unit 302, an input unit 303 (input device), a first play unit 304, a setting unit 308, a detection area designation unit 309 (designation unit), an image distribution unit 312, a detection area determination unit 314 (determination unit), a first control unit 316, a second play unit 318, an area display control unit 319, a list control unit 320, a second control unit 321, a display control unit 331, an external output unit 332, and a display unit 333 (display device). Each of the first play unit 304 and second play unit 318 may be referred to as the play unit or the first play unit 304 and second play unit 318 may be collectively referred to as the play unit. In FIG. 3, for simplifying the description, the hub 4 is omitted.

The image reception unit 301 performs data communication with the image capture apparatus 2 and the virtual camera 5 to receive the image data from the image capture apparatus 2 (first image data) and the image data from the virtual camera 5 (second image data). The image reception unit 301 stores the received image data in the storage unit 302. The image reception unit 301 is implemented by the network I/F 106 and executing the programs by the CPU 101 illustrated in FIG. 2.

The storage unit 302 is a storage device or memory that stores, for example, image data received by the image reception unit 301, various setting information, and time information to be described later. The storage unit 302 stores the image data received by the image reception unit 301 by identifying which image capture apparatus 2 or which virtual camera 5 has generated the image data received by the image reception unit 301. The storage unit 302 is implemented, for example, by the RAM 103 or the auxiliary storage device 104 illustrated in FIG. 2.

The input unit 303 corresponds to a device that is used to perform an input operation when performing, for example, an image-based determination operation using the information processing apparatus 3. The input unit 303 is implemented by the keyboard 107 and the mouse 108 illustrated in FIG. 2.

In response to receiving an operation signal from the input unit 303 operated by a user, the first play unit 304 transmits the image data, acquired from the storage unit 302, to the display control unit 331, and instructs the display control unit 331 to play and display the image data using the display unit 333. Specifically, the first play unit 304 plays and displays the image data on a setting image display section 502 of a setting screen 500 (to be described later with reference to FIG. 6) displayed using the display unit 333. The first play unit 304 is implemented by executing the programs by the CPU 101 illustrated in FIG. 2.

In response to receiving an operation signal from the input unit 303 operated by a user, the setting unit 308 sets and stores various setting information in the storage unit 302.

Further, among the setting information set and stored in the storage unit 302, the setting unit 308 transmits particular setting information that is required to be displayed to the display control unit 331 from the storage unit 302, and instructs the display control unit 331 to display the particular setting information using the display unit 333. The setting unit 308 is implemented by executing the programs by the CPU 101 illustrated in FIG. 2.

In response to receiving an operation signal from the input unit 303 operated by a user, the detection area designation unit 309 designates a specific detection area, which is a target of image-based determination operation for detecting abnormality on a display area (setting image display section 502, first display area) of the image data being displayed on the display unit 333. The detection area designation unit 309 stores information on the designated detection area in the storage unit 302 in association with the image capture apparatus 2 or the virtual camera 5.

Further, the information on the detection area includes, for example, coordinate information indicating a position of the detection area in the display area of the image data, and information on shape of the detection area. The detection area designated by the detection area designation unit 309 is used when performing a detection processing to be described later. The detection area designation unit 309 is implemented by executing the programs by the CPU 101 illustrated in FIG. 2.

Further, as to the above described image-based determination operation, the image-based determination operation is performed for detecting abnormality (abnormality detection), but is not limited thereto. For example, the image-based determination operation can be performed for determining whether or not a specific event has occurred. In this description, for the simplicity of description, the image-based determination operation for detecting abnormality (abnormality detection) is described as an example of the image-based determination operation.

In response to receiving an operation signal from the input unit 303 operated by a user, the image distribution unit 312 transmits real-time image data acquired from the image reception unit 301 to the display control unit 331, and instructs the display control unit 331 to display the real-time image data using the display unit 333. Specifically, the image distribution unit 312 distributes corresponding image data to image display sections 401a to 401f of a watcher screen 400, displayed on the display unit 333, to be described later with reference to FIG. 5, to display the corresponding image data on the image display sections 401a to 401f.

Further, the image distribution unit 312 stores or records the image data to be displayed on the image display sections 401a to 401f in the storage unit 302. The image distribution unit 312 is implemented by executing the programs by the CPU 101 illustrated in FIG. 2.

After starting a monitoring operation by displaying the image data on the image display sections 401a to 401f of the watcher screen 400 of FIG. 5, to be described later, the detection area determination unit 314 compares a detection reference image and a target image in a detection area set in the image data, such as frame or image (detection area set on the image display sections 401a to 401f of the watcher screen 400), to determine whether abnormality occurs. The detection area determination unit 314 is implemented by executing the programs by the CPU 101 illustrated in FIG. 2.

In response to receiving an operation signal from the input unit 303 operated by a user, the first control unit 316 starts and stops the monitoring operation using the watcher screen 400 (FIG. 5), to be described later, and also controls the entire operation of the watcher 400. The first control unit 316 is implemented by executing the programs by the CPU 101 illustrated in FIG. 2.

In response to receiving an operation signal from the input unit 303 operated by a user, the second play unit 318 transmits the image data acquired from the storage unit 302 to the display control unit 331, and instructs the display control unit 331 to play and display the image data using the display unit 333. Specifically, the second play unit 318 distributes corresponding image data to image display sections 701a to 701f of a viewer screen 700 displayed on the display unit 333, to be described later with reference to FIG. 13, to play and display the corresponding image data on the image display sections 701a to 701f. The second play unit 318 is implemented by executing the programs by the CPU 101 illustrated in FIG. 2.

The area display control unit 319 displays a state of each detection area by superimposing the state of each detection area on the image data, such as frame or image, being played and displayed on the image display sections 701a to 701f of the viewer screen 700 based on information on detection time (time information) of each detection area stored in the storage unit 302. The area display control unit 319 is implemented by executing the programs by the CPU 101 illustrated in FIG. 2.

The list control unit 320 reads out a marker file stored in the storage unit 302, on the viewer screen 700, and displays a marker list screen 800 (information list) on the viewer screen 700, to be described later with reference to FIG. 14, which displays content of the marker file. In this description, the marker file is a file that records time of detecting abnormality using the detection processing in a time series. The list control unit 320 is implemented by executing the programs by the CPU 101 illustrated in FIG. 2.

The second control unit 321 controls the operation of the viewer screen 700 entirely. The second control unit 321 is implemented by executing the programs by the CPU 101 illustrated in FIG. 2.

The display control unit 331 controls a display operation of the display unit 333. Specifically, the display control unit 331 instructs the display unit 333 to display the image data acquired from the first play unit 304 and the image distribution unit 312, the setting information set by the setting unit 308, and the detection area designated by the detection area designation unit 309. The display control unit 331 is implemented by executing the programs (drivers) by the CPU 101 illustrated in FIG. 2.

When the detection area determination unit 314 determines that the abnormality is detected, the external output unit 332 outputs an abnormal-detection signal to the external device 10. The external output unit 332 is implemented by the external device I/F 111 and executing the programs by the CPU 101 illustrated in FIG. 2. In this description, the external output unit 332 outputs the abnormal-detection signal, but is not limited thereto. For example, the external output unit 332 may transmit a batch file used for notifying abnormality to the external device 10 using email, or the external output unit 332 may notify abnormality using the watcher screen 400, such as flashing of a lamp icon.

The display unit 333 is a device or apparatus that displays various data under the control of the display control unit 331. In the embodiment, by executing the programs (applications) by the CPU 101 illustrated in FIG. 2, the display unit 333 displays the watcher screen 400 (FIG. 5), the setting screen 500 (FIG. 6), and the viewer screen 700 (FIGS. 13, 14), to be described later. The display unit 333 is implemented by the display 105 illustrated in FIG. 2.

Further, a portion or entire of the first play unit 304, the setting unit 308, the detection area designation unit 309, the image distribution unit 312, the detection area determination unit 314, the first control unit 316, the second play unit 318, the area display control unit 319, the list control unit 320, the second control unit 321, and the display control unit 331 illustrated in FIG. 3 may be implemented by hardware circuits, such as application specific integrated circuit (ASIC) or field-programmable gate array (FPGA) instead of software program.

Further, the functional units illustrated in FIG. 3 are conceptually illustrated, and the functional configuration is not limited to the configuration of the FIG. 3. For example, a plurality of functional units illustrated in FIG. 3 as respective independent functional units may be configured as one functional unit. On the other hand, the function of one functional unit illustrated in FIG. 3 may be divided into a plurality of functions, and a plurality of functional units may be formed.

Further, for simplifying the description, the expression that the display control unit 331 instructs the display unit 333 to display the received data can be expressed that the functional unit, which transmits the data to the display control unit 331, instructs the display unit 333 to display the data (or a screen displayed using the display unit 333). For example, when the first play unit 304 transmits the image data to the display control unit 331, and the display control unit 331 instructs the display unit 333 to play and display the image data, it is simply expressed that the first play unit 304 instructs the display unit 333 to play and display the image data.

(Directory Structure of Information Stored in Storage Unit)

Figure 4:
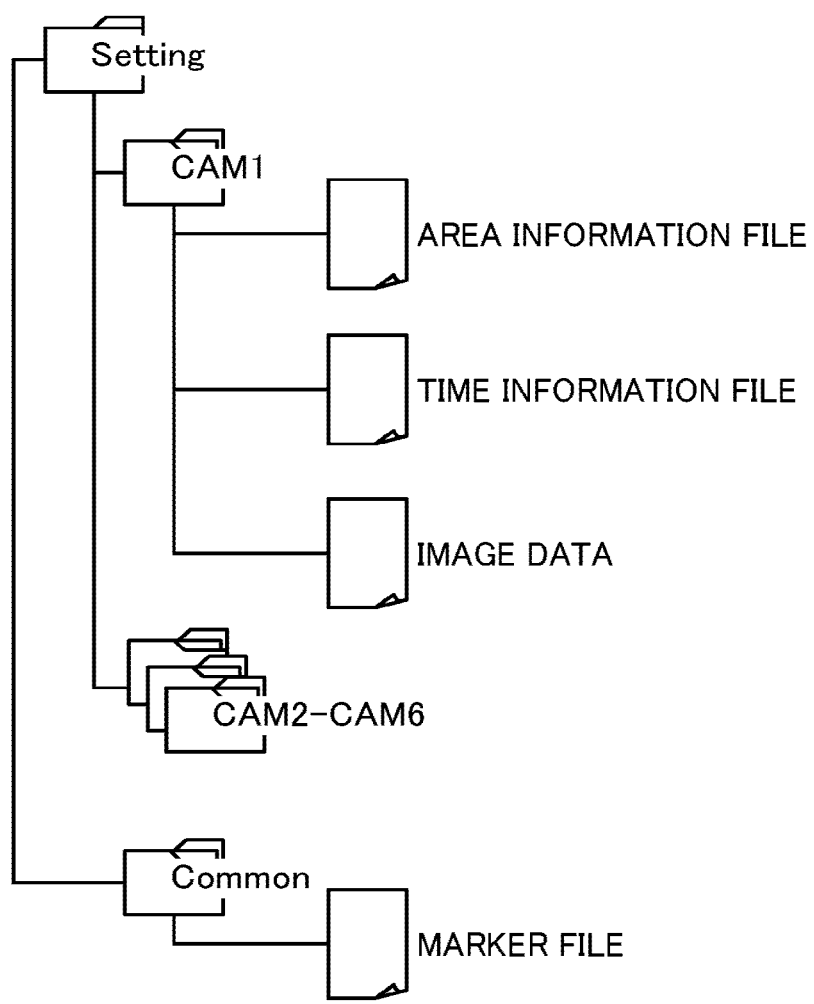
FIG. 4 is an example of directory structure of information stored in a storage unit of the information processing apparatus according to the embodiment.

FIG. 4 is an example of directory structure of information stored in the storage unit 302 of the information processing apparatus 3. Hereinafter, with reference to FIG. 4, a description is given of the directory structure used for managing or controlling information using the storage unit 302.

As illustrated in FIG. 4, the storage unit 302 forms, for example, root folders, such as "Setting" folder and "Common" folder. The "Setting" folder forms "CAM1" to "CAM6" folders (hereinafter, referred to simply as "camera folder") to store information related to the each image capture apparatus 2 and the virtual camera 5. The "CAM1" to "CAM6" folders respectively correspond to folders related to the virtual camera 5 and the image capture apparatuses 2b to 2f.

As illustrated in FIG. 4, each camera folder stores, for example, area information file, time information file, and image data.

The area information file is a file including location or position information of each detection area (e.g., coordinate information indicating position, information of shape of detection area), and attribute information to be described later set for the corresponding image capture apparatus 2 or virtual camera 5.

The time information file is a file including a specific time of starting a specific monitoring operation and a specific time of ending the specific monitoring operation, a specific time of designating or setting each detection area, and a specific time of detecting each detection area during the specific monitoring operation, set for the corresponding image capture apparatus 2 or virtual camera 5.

The image data is data, such as the detection reference image, to be described later.

Further, the "Common" folder stores the marker file described above.

Further, the directory structure for managing or controlling the information illustrated in FIG. 4 is just one example, and is not limited thereto, but other data structure can be used for managing or controlling the information. Further, the names of folders illustrated in FIG. 4 are just examples, and are not limited thereto.

(Watcher Screen)

Figure 5:
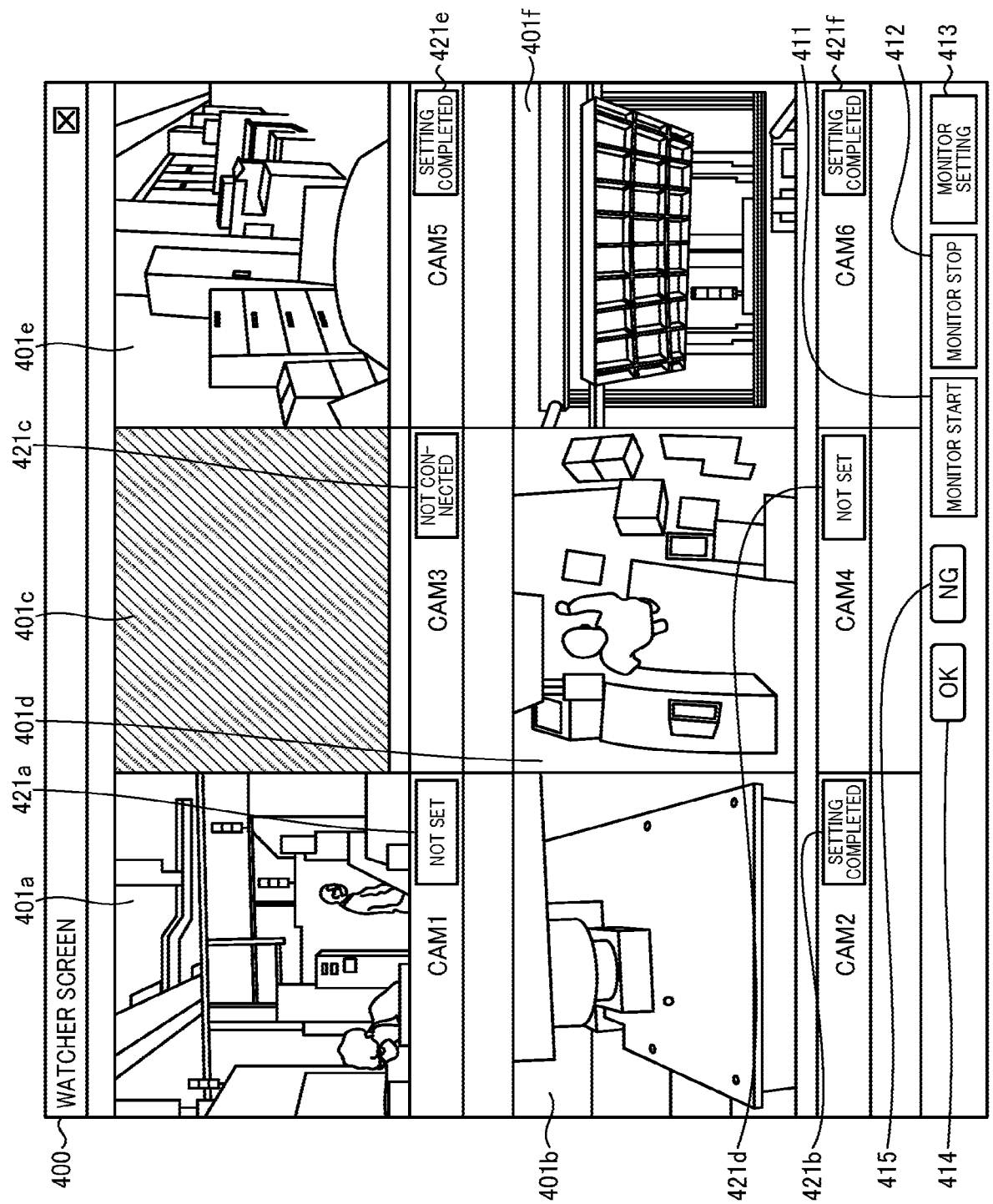
FIG. 5 is an example of a watcher screen displayable on a display device of the information processing apparatus according to the embodiment, in which real-time images, such as a plurality images and movie images, are displayed.

FIG. 5 is an example of a watcher screen displayable on a display device of the information processing apparatus 3 according to the embodiment, in which a plurality of real-time image data is displayed on a display device of the information processing apparatus 3. Hereinafter, with reference to FIG. 5, a description is given of configuration of the watcher screen 400 and operation of displaying the plurality of real-time image data.

By executing the programs (applications) by the CPU 101, the watcher screen 400 is displayed using the display unit 333 as illustrated in FIG. 5. The watcher screen 400 is a screen that displays the image data, such as image data received from a plurality of the image capture apparatuses 2 and image data received from the virtual camera 5 in real-time, and if the image-based determination operation (monitoring operation) is being performed, the image-based determination operation is performed at each of the designated detection area using the watcher screen 400. Specifically, when the image-based determination operation (monitoring operation) is being performed using the watcher screen 400, the detection area determination unit 314 determines whether abnormality has occurred at a specific detection area designated by the detection area designation unit 309.

As illustrated in FIG. 5, the watcher screen 400 includes, for example, the image display sections 401a, 401b, 401c, 401d, 401e, and 401f (hereinafter, image display sections 401a to 401f, a monitor start button 411, a monitor stop button 412, a monitor setting button 413, an OK lamp 414, a not-good (NG) lamp 415, and state display sections 421a, 421b, 421c, 421d, 421e, and 421f (hereinafter, state display sections 421a to 421f).

In response to receiving an operation signal from the input unit 303 operated by a user, the image distribution unit 312 distributes the real-time image data acquired from the image capture apparatuses 2a to 2f via the image reception unit 301 to the image display sections 401a to 401f to display the real-time image data respectively on the image display sections 401a to 401f.

Further, when any one of the image display sections 401a to 401f is pressed in response to a user operation to the input unit 303 (e.g., click operation of mouse 108), the pressed image display section 401 can be set to a selected state.

Further, the image display sections 401a to 401f may be collectively referred to as the image display section 401 (second display area) when not distinguishing the image display sections 401a to 401f.

When the monitor start button 411 is pressed in response to a user operation to the input unit 303 while displaying the real-time image data on the image display section 401 being at the selected state, the processing of determining presence or absence of abnormality in the detection area designated by the detection area designation unit 309 is started.

When the monitor stop button 412 is pressed in response to a user operation to the input unit 303, the processing of determining presence or absence of abnormality in the detection area, designated in the image display section 401 being at the selected state, being performed by the detection area determination unit 314 is stopped.

When the monitor setting button 413 is pressed in response to a user operation to the input unit 303, the first control unit 316 instructs the display unit 333 to display the setting screen 500 illustrated in FIG. 6, to be described later, to set each determination area.

When the detection area determination unit 314 performs the processing of determining presence or absence of abnormality in the detection area designated in the image display section 401 being at the selected state, and then the determination result of absence of abnormality is obtained, the OK lamp 414 is lit or illuminated by the first control unit 316. For example, as to the image display section 401 being at the selected state, when all of detection areas are determined to have no abnormality for the detection areas designated in the image display section 401, which is a lamp-on target of the OK lamp 414 and the NG lamp 415, the OK lamp 414 is lit or illuminated by the first control unit 316.

When the detection area determination unit 314 performs the processing of determining presence or absence of abnormality in the detection area designated in the image display section 401 being at the selected state, and then the determination result of presence of abnormality is obtained, the NG lamp 415 is lit or illuminated by the first control unit 316. For example, as to the image display section 401 being at the selected state, when at least one detection area is determined to have abnormality for the detection areas designated in the image display section 401, which is a lamp-on target of the OK lamp 414 and the NG lamp 415, the NG lamp 415 is lit or illuminated by the first control unit 316.

Each of the state display sections 421a to 421f displays a specific state of the image capture apparatus 2 and the virtual camera 5 corresponding to each of the image display sections 401. For example, each of the state display sections 421a to 421f displays contents of the state of the image capture apparatus 2 and the virtual camera 5, such as "not connected," "not set," "setting completed," and "monitoring."

The "not connected" indicates a state that the image capture apparatus 2 or the virtual camera 5 corresponding to the image display section 401 is not connected to the information processing apparatus 3, and the image data is not displayed on the image display section 401. For example, in an example case of FIG. 5, since the image capture apparatus 2 (specifically, the image capture apparatus 2c) corresponding to the image display section 401c is not connected to the information processing apparatus 3, the state display unit 421c displays "not connected" and the image display section 401c does not display the image data.

The "not set" indicates a state that the detection area is not set for the image data displayed on the image display section 401.

The "setting completed" indicates a state that the detection area is set for the image data displayed on the image display section 401.

The "monitoring" indicates a state that the image-based determination operation (monitoring operation) is being performed based on information on each detection area that is set.

Further, the state display sections 421a to 421f may be collectively referred to as "state display section 421" when not distinguishing the state display sections 421a to 421f.

(Setting Screen)

Figure 6:
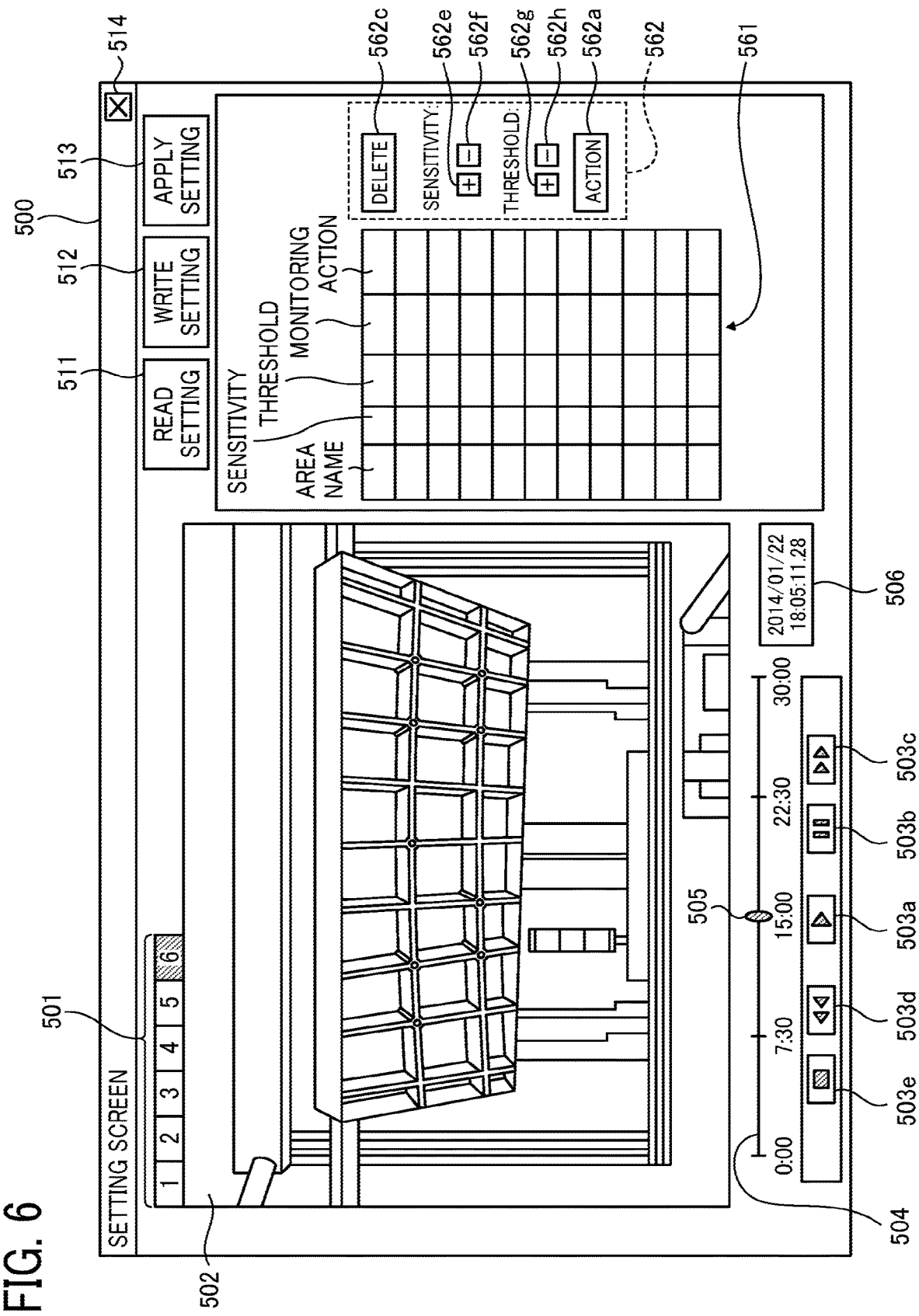
FIG. 6 is an example of a state of displaying image data on a setting screen being displayed on a display device of the information processing apparatus according to the embodiment.

FIG. 6 is an example of a state of displaying image data on a setting screen being displayed on the display device of the information processing apparatus according to the embodiment. Hereinafter, with reference to FIG. 6, a description is given of configuration of the setting screen 500.

The setting screen 500 is a screen used for setting conditions, such as detection area, and sensitivity and threshold value used for the image-based determination operation at the detection area. The setting screen 500 is used for setting the setting information used for the detection processing. As illustrated FIG. 6, the setting screen 500 includes, for example, a camera selection tab 501, a setting image display section 502, a play button 503a, a pause button 503b, a fast-forward button 503c, a fast-backward button 503d, a stop button 503e, a seek bar 504, a slider 505, a time display section 506, a read setting button 511, a write setting button 512, an apply setting button 513, a close button 514, a detection area information section 561, and a detection area button group 562.

When a user wants to designate the detection area for the image data captured by the image capture apparatuses 2b to 2f and the image data output by the virtual camera 5, the user uses the camera selection tab 501 as an operation member for selecting which image data is to be displayed on the setting image display section 502. For example, the image data output from the virtual camera 5 and the image data captured by the image capture apparatuses 2b to 2f are respectively associated with "1" to "6" of the camera selection tab 501. In an example case of FIG. 6, the image data of the image capture apparatus 2f associated with "6" is selected.

In response to receiving an operation signal from the input unit 303 operated by a user, the first play unit 304 acquires the image data from the storage unit 302, and then the first play unit 304 plays and displays the image data on the setting image display section 502. In an example case of FIG. 6, when the camera selection tab 501 of "6" is selected in response to a user operation to the input unit 303, the first play unit 304 plays and displays the image data captured by the image capture apparatus 2f on the setting image display section 502.

When the play button 503a is pressed in response to a user operation to the input unit 303, the first play unit 304 starts to play the image data displayed on the setting image display section 502.

When the pause button 503b is pressed in response to a user operation to the input unit 303, the first play unit 304 temporarily stops a playing of the image data being played and displayed on the setting image display section 502.

When the fast-forward button 503c is pressed in response to a user operation to the input unit 303, the first play unit 304 plays the image data being played and displayed on the setting image display section 502 using a fast-forward playing mode.

When the fast-backward button 503d is pressed in response to a user operation to the input unit 303, the first play unit 304 plays the image data being played and displayed on the setting image display section 502 using a fast-backward playing mode. When the stop button 503e is pressed in response to a user operation to the input unit 303, the first play unit 304 stops a playing of the image data being played and displayed on the setting image display section 502.

The seek bar 504 has a rod-shaped shape, on which the slider 505 is arranged. The positions of the slider 505 on the seek bar 504 indicate time points of the image data being played and displayed on the setting image display section 502.

The slider 505 having a given shape is an operation member that can slide to any position on the seek bar 504, in which the position of the slider 505 on the seek bar 504 indicates a specific time of capturing the image data being played and displayed on the setting image display section 502, such as time of capturing the displayed frame, or time of acquiring the displayed image.

On the other hand, when the slider 505 slides on the seek bar 504 in response to a user operation to the input unit 303, the first play unit 304 displays, on the setting image display section 502, the image data, such as frame or image, of the specific time corresponding to the position of the slider 505 on the seek bar 504.

The time display section 506 displays specific date (including image acquisition date) and specific time that captures the image data being played and displayed on the setting image display section 502 by the first play unit 304.

When the read setting button 511 is pressed in response to a user operation to the input unit 303, the setting unit 308 reads out information on the detection area related to the image capture apparatus 2 or the virtual camera 5 selected by the camera selection tab 501, stored in the storage unit 302, and then the information on the detection area is displayed on each display section of the setting screen 500.

When the write setting button 512 is pressed in response to a user operation to the input unit 303, the setting unit 308 stores the information on the detection area set on the setting screen 500 in the storage unit 302 in association with the image capture apparatus 2 or the virtual camera 5 selected by the camera selection tab 501.

When the apply setting button 513 is pressed in response to a user operation to the input unit 303, the setting unit 308 enables the information on the detection area set on the setting screen 500 until the application, such as the watcher screen 400 and the setting screen 500, is closed (e.g., temporally stored in the RAM 103).

When the close button 514 is pressed in response to a user operation to the input unit 303, the setting unit 308 closes the setting screen 500, and displays the watcher screen 400 using the display unit 333.

The detection area information section 561 is a display area and selection operation area used for displaying various information, such as area name, sensitivity value, threshold value, and monitoring method ("monitoring" in FIG. 6) of the detection area designated by the detection area designation unit 309, and presence (Yes) or absence (No or none) of action ("action" in FIG. 6). Hereinafter, these information is collectively referred to as "attribute information" in this description.

The detection area button group 562 is a button group used for editing the attribute information related to the detection area designated by the detection area designation unit 309 and displayed on the detection area information section 561. As illustrated in FIG. 6, the detection area button group 562 includes, for example, an action button 562a, a delete button 562c, a sensitivity increase button 562e, a sensitivity decrease button 562f, a threshold increase button 562g, and a threshold decrease button 562h. The function of each button of the detection area button group 562 will be described later.

(Designation of Detection Area)

Figure 7:
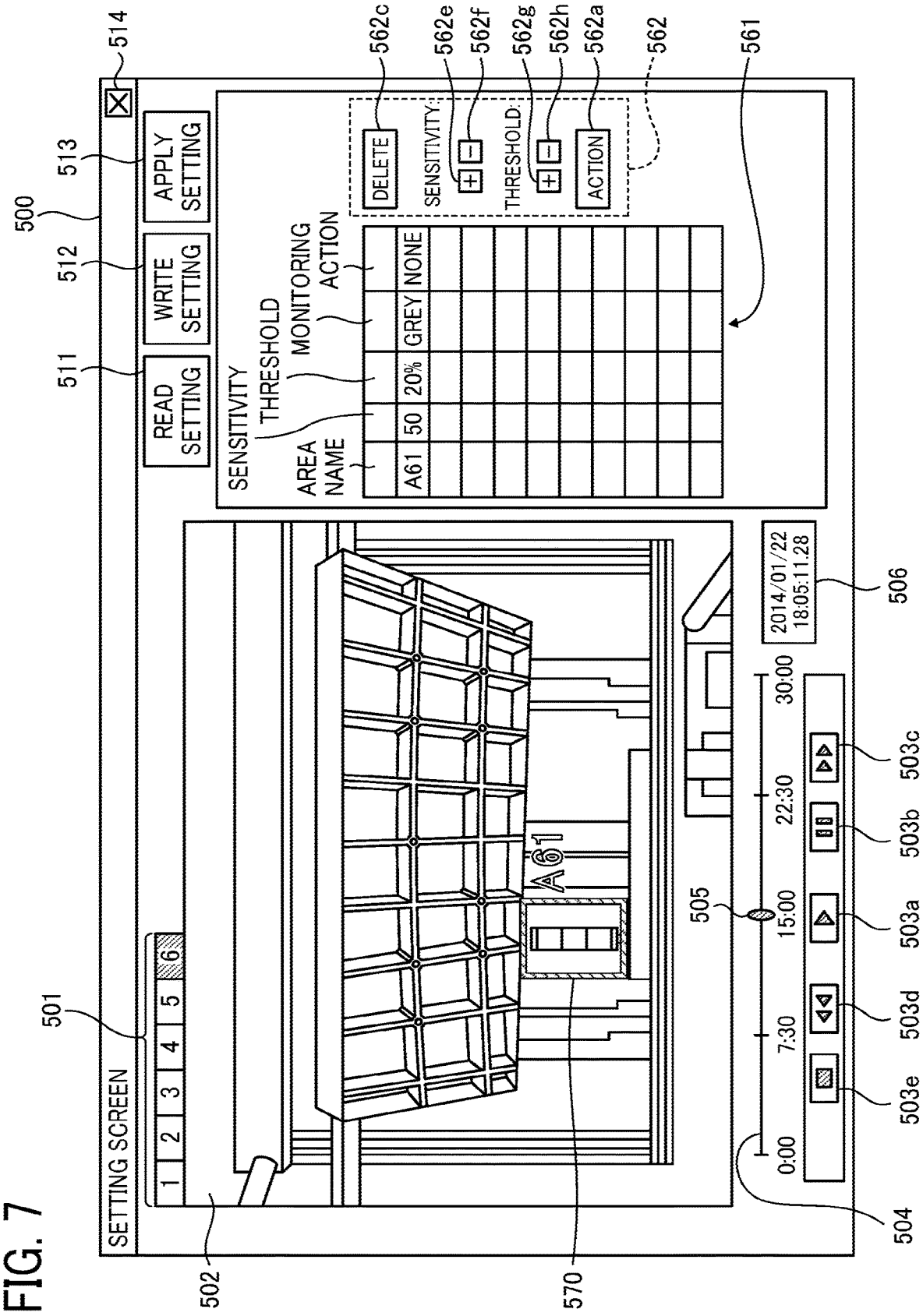
FIG. 7 is an example of designating a detection area on a setting image display section displayed on a display device of the information processing apparatus according to the embodiment.

FIG. 7 is an example of designating a detection area on a setting image display section displayed on a display device of the information processing apparatus 3 according to the embodiment. Hereinafter, with reference to FIG. 7, a description is given of designation of the detection area.

In an example case of FIG. 7, the setting screen 500 indicates a state that a detection area 570 is designated on the setting image display section 502 where the image data is being played and displayed by the first play unit 304. Specifically, when the pause button 503b is pressed in response to a user operation to the input unit 303 at a time of displaying an image portion where the user wants to perform the image-based determination operation using the detection processing while the setting image display section 502 plays and displays the image data, the first play unit 304 pauses a playing of the image data being displayed on the setting image display section 502, and uses the time display section 506 to display a specific captured date and time of the frame or the image corresponding to the pausing of the playing of the image data.

Then, in response to a user operation to the input unit 303 (e.g., drag operation of the mouse 108), the detection area designation unit 309 designates and displays the detection area 570 on the setting image display section 502.

The setting unit 308 displays, on the detection area information section 561, the attribute information of the detection area 570, such as a name assigned to the detection area designated by the detection area designation unit 309, and default values, to be described later, such as given sensitivity value (e.g., "50"), given threshold value (e.g., "20%"), monitoring method (e.g., grey scale), and presence or absence of action (e.g., None, absence) used for the image-based determination operation. As illustrated in FIG. 7, the setting unit 308 assigns the name of the detection area 570, for example, "A61" for the detection area designated for the image data of the image capture apparatus 2 (e.g., image capture apparatus 2f) corresponding to "6" of the camera selection tab 501.

Further, the detection area designation unit 309 extracts a frame displayed on the setting image display section 502 at a time when the detection area 570 is designated, or an image of the detection area 570 in a particular image at a time when the detection area 570 is designated as a detection reference image, and stores the detection reference image in the storage unit 302 in association with the image capture apparatus 2 or the virtual camera 5 selected by the camera selection tab 501 (e.g., image capture apparatus 2f in FIG. 7), and stores information on the designated detection area 570 (e.g., location or position information such as location and shape, attribute information) in the storage unit 302.

Further, the detection area designation unit 309 stores information on time when the detection area 570 is designated (i.e., time information) in the storage unit 302 in association with the image capture apparatus 2 or the virtual camera 5 selected by the camera selection tab 501. Further, the detection area designation unit 309 can designate a plurality of detection areas in the same manner as described above.

The attribute information on the detection area (the detection area 570 in FIG. 7) designated at the setting screen 500 illustrated in FIG. 7 can be edited. When any of the detection areas for which the attribute information is displayed on the detection area information section 561 (in FIG. 7, the attribute information on the detection area 570 alone is displayed) is selected in response to a user operation to the input unit 303, the setting unit 308 inverts a displaying style at a portion of displaying the attribute information on the detection area in the selected detection area information section 561. Hereinafter, with reference to FIG. 7, a description is given of a case that the detection area 570 (detection area name is "A61") is selected.

Then, for example, when the action button 562a is pressed in response to a user operation to the input unit 303, the setting unit 308 switches a setting value for presence or absence of action of the selected detection area 570. For example, if the presence or absence of action of the selected detection area 570 is "None (absence)" and then the action button 562a is pressed, the setting unit 308 sets a value of "Yes (presence)."

On the other hand, if the presence or absence of action of the selected detection area 570 is "Yes (presence)" and then the action button 562a is pressed, the setting unit 308 sets a value of "None (absence)."

As to the described later, if the presence or absence of action of the selected detection area 570 is "Yes (presence)," and the detection area determination unit 314 determines abnormality at the selected detection area by performing the image-based determination operation, the external output unit 332 outputs an abnormal-detection signal.

Further, for example, when the deletion button 562c is pressed in response to a user operation to the input unit 303, the setting unit 308 deletes the attribute information on the detection area 570 displayed on the detection area information section 561, and deletes the information on the detection area 570 stored in the storage unit 302. Further, the detection area designation unit 309 deletes the detection area 570 displayed on the setting image display section 502, and deletes the detection reference image stored in the storage unit 302.

Further, for example, when the sensitivity increase button 562e is pressed in response to a user operation to the input unit 303, the setting unit 308 increases a value of sensitivity used for the image-based determination operation of the selected detection area 570 for a given value. On the other hand, when the sensitivity decrease button 562f is pressed in response to a user operation to the input unit 303, the setting unit 308 decreases the value of sensitivity used for the image-based determination operation of the selected detection area 570 for a given value.

Further, for example, when the threshold increase button 562g is pressed in response to a user operation to the input unit 303, the setting unit 308 increases a value of threshold used for the image-based determination operation of the selected detection area 570 for a given value. On the other hand, when the threshold decrease button 562h is pressed in response to a user operation to the input unit 303, the setting unit 308 decreases a value of threshold used for the image-based determination operation of the selected detection area 570 for a given value.

(Image Determination Operation using Watcher Screen)

Figure 8:
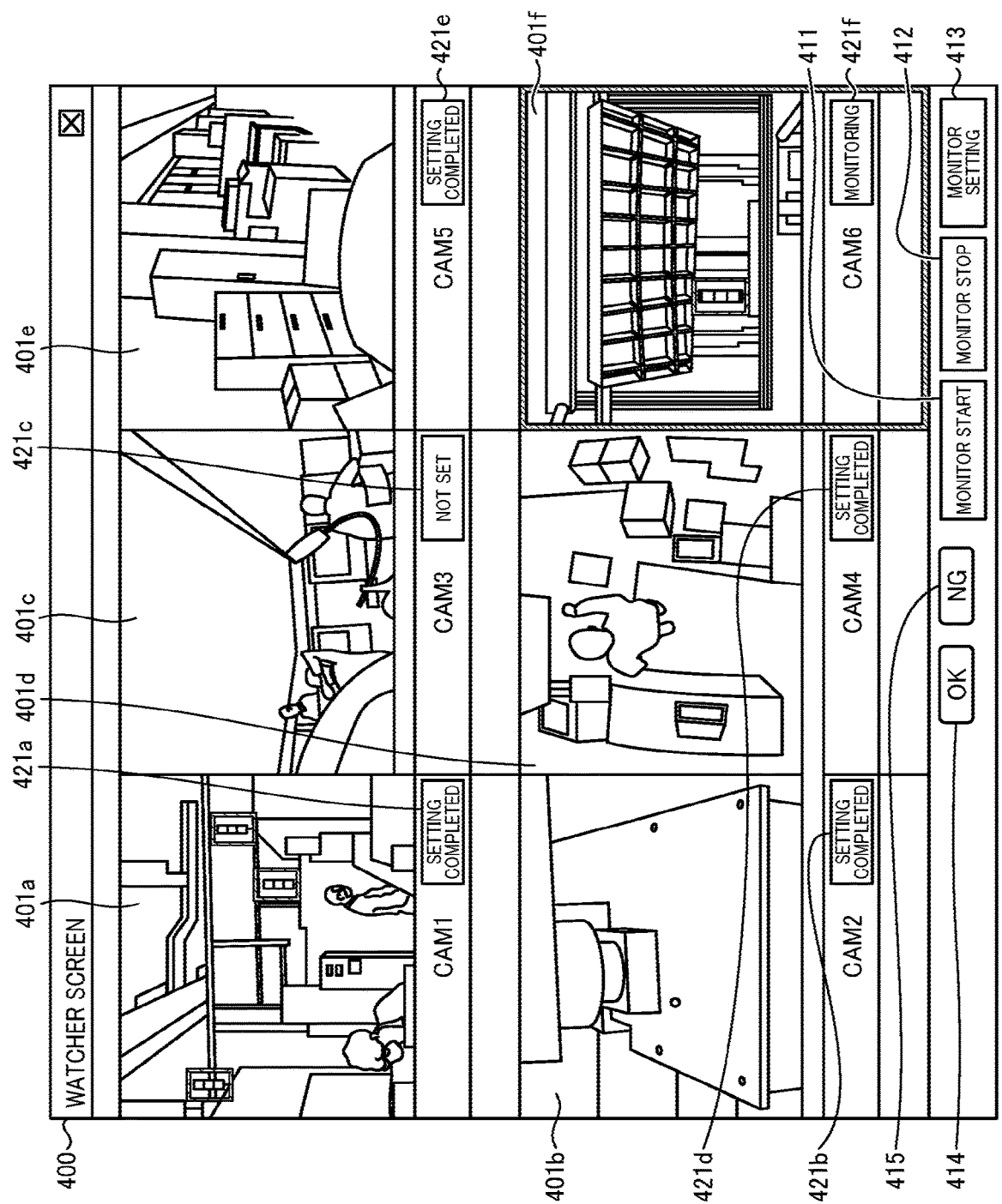
FIG. 8 illustrates an example of a state in which a monitoring operation is being performed using a watcher screen being displayed on a display device of the information processing apparatus according to the embodiment.

FIG. 8 illustrates an example of a state in which a monitoring operation is being performed using a watcher screen being displayed on a display device of the information processing apparatus 3 according to the embodiment.

Figure 9:
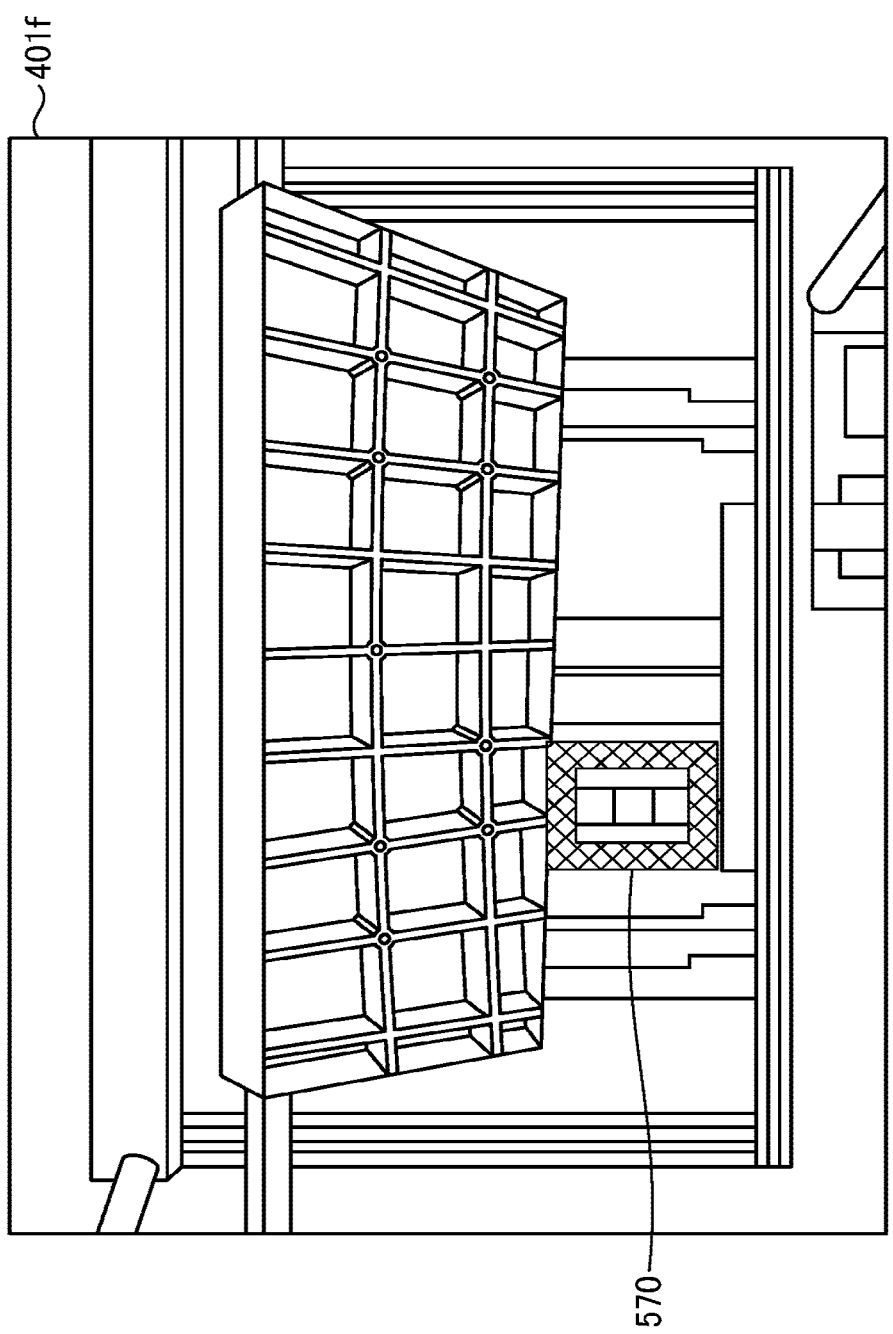
FIG. 9 illustrates an example of a state in which an image-based determination operation is performed for a detection area while performing a monitoring operation using a watcher screen being displayed on a display device of the information processing apparatus according to the embodiment.

FIG. 9 illustrates an example of a state in which an image-based determination operation is performed for a detection area while performing the monitoring operation using the watcher screen being displayed on the display device of the information processing apparatus 3 according to the embodiment.

FIGS. 8 and 9 illustrate an example of the state in which an image-based determination operation is performed for the detection area while performing the monitoring operation using the watcher screen being displayed on the display device of the information processing apparatus 3 according to the embodiment.

Hereinafter, with reference to FIG. 8, a description is given of the image-based determination operation (monitoring operation) using the watcher screen 400.

As illustrated in FIG. 8, the watcher screen 400 displays real-time image data received from a plurality of the image capture apparatuses 2 and the virtual camera 5, and the detection area "A61" (see FIG. 7) is designated in the image display section 401f. As to the image-based determination operation using the watcher screen 400, the displaying of name of each determination area displayed on the image display section 401 is omitted in order to avoid the complexity of the appearance of screen.

In this description, the detection processing is a function of performing the image-based determination operation that determines whether or not an image in the detection area has abnormality while performing the monitoring operation using the watcher screen 400. Further, after a transition or shifting from the setting screen 500 to the watcher screen 400, the first control unit 316 displays "setting completed" in the state display section 421f because the setting of each detection area has been completed for the image display section 401f.

Then, a user operates the input unit 303 to press the image display section 401 corresponding to the image capture apparatus 2 or the virtual camera 5 that the user wants to start the image-based determination operation (monitoring operation) to set the selected state for the image display section 401.

In an example case of FIG. 8, the image display section 401f is pressed and set as the selected state. Then, if the monitor start button 411 is pressed in response to a user operation to the input unit 303, the first control unit 316 starts the image-based determination operation for the real-time image data captured by the image capture apparatus 2f, which is displayed on the image display section 401f. At this stage, as illustrated in FIG. 8, the first control unit 316 displays "monitoring" at the state display section 421f to indicate that the image-based determination operation is being performed for the image capture apparatus 2f.

Further, the first control unit 316 stores information on time (time information) when the image-based determination operation (monitoring operation) is started in the storage unit 302 in association with the image capture apparatus 2 corresponding to the image display section 401 being at the selected state.

Further, if the monitor stop button 412 is pressed in response to a user operation to the input unit 303, the first control unit 316 stops the image-based determination operation for the image display section 401 being at the selected state, and stores information on time (time information) when the image-based determination operation (monitoring operation) is stopped in the storage unit 302 in association with the image capture apparatus 2 corresponding to the image display section 401 being at the selected state.

As to the image-based determination operation using the watcher screen 400, at first, the image distribution unit 312 respectively distributes the real-time image data acquired from image reception unit 301 to the image display sections 401a to 401f to display the image data respectively on the image display sections 401a to 401f.

Further, the detection area determination unit 314 acquires the attribute information on the designated detection area (the detection area 570 in FIG. 7) from the storage 302.

While the monitoring operation is being performed, the detection area determination unit 314 compares a detection reference image and a target image in the detection area set in the image data, such as frame or image, to perform the image-based determination operation, such as determining whether or not abnormality occurs.

Specifically, the detection area determination unit 314 compares the target image in the detection area (corresponding to the detection area 570) set in the image data, such as frame or image, and the detection reference image to perform the image-based determination operation, such as determining whether or not abnormality occurs.

The detection area determination unit 314 performs the image-based determination operation by comparing the detection reference image and the target image at the detection area 570 to determine whether abnormality has occurred at the detection area 570. Specifically, the detection area determination unit 314 compares values of pixels of the detection reference image at the detection area 570 and values of pixels of the target image (i.e., image data) at the detection area 570 for each of corresponding pixels based on the sensitivity (e.g., sensitivity of "50" in FIG. 7) to determine a value difference of each of corresponding pixels of the detection reference image and the target image, and counts the total number of pixels where the value difference becomes the sensitivity (e.g., sensitivity of "50" in FIG. 7) or more. If the counted total number of pixels where the value difference becomes the sensitivity (e.g., sensitivity of "50" in FIG. 7) or more becomes the given threshold value (e.g., threshold of "20%" in FIG. 7) or more, the detection area determination unit 314 determines that abnormality has occurred at the detection area 570.

Further, if the counted total number of pixels where the value difference becomes the sensitivity (e.g., sensitivity of "50" in FIG. 7) or more becomes less than the given threshold value (e.g., threshold of "20%" in FIG. 7), the detection area determination unit 314 determines that the detection area 570 is in the normal state (i.e., no abnormality has occurred).

Further, if the detection area determination unit 314 determines that the detection area 570 is in the normal state (i.e., no abnormality has occurred) by performing the image-based determination operation, and the image display section 401f is set as the lamp-on target of the OK lamp 414 and the NG lamp 415, and a result of the image-based determination operation at another image display section 401 set as the lamp-on target of the OK lamp 414 and the NG lamp 415 is in the normal state (i.e., no abnormality has occurred), the first control unit 316 turns on the OK lamp 414.

Further, if the detection area determination unit 314 determines that abnormality has occurred at the detection area 570 by performing the image-based determination operation, as illustrated in FIG. 9, the first control unit 316 displays a frame indicating the detection area 570 using a specific color different from a color used for the normal state, and using a specific frame line that is bolder or thicker than the frame line used for the normal state. For example, the first control unit 316 displays the frame indicating the detection area 570 using a color of "red" and bolder or thicker line for a given time period, such as one second, to indicate the detection of abnormality.

Further, if the abnormality is detected at the detection area 570 by performing the image-based determination operation, and the image display section 401f is set as the lamp-on target of the OK lamp 414 and the NG lamp 415, the first control unit 316 turns on the NG lamp 415. Then, when one second elapses, the first control unit 316 returns the displaying style of the frame indicating the detection area 570 to the displaying style used for the normal state.

Further, when the detection area determination unit 314 performs the image-based determination operation by comparing the detection reference image and the target image at the detection area 570 to determine whether abnormality has occurred at the detection area 570, and if the counted total number of pixels where the value difference becomes the sensitivity (e.g., sensitivity of "50" in FIG. 7) or more becomes the given threshold value (e.g., threshold of "20%" in FIG. 7) or more, and the detection area determination unit 314 determines that abnormality has occurred at the detection area 570, the first control unit 316 can be configured to continue the state of displaying the frame indicating the detection area 570 using the color of "red" and bolder or thicker line to continuously indicate the state of detecting the abnormality. In this case, the turn-on operation of the NG lamp 415 can be performed similarly.

Then, the detection area determination unit 314 stores information on time (time information) when the abnormality is detected by performing the image-based determination operation (monitoring operation) in the storage unit 302 in association with the image capture apparatus 2 or the virtual camera 5 that is subjected to the image-based determination operation.

Further, the detection area determination unit 314 writes the information on time (time information) when the abnormality is detected by performing the image-based determination operation to a marker file stored in the storage unit 302 in association with the image capture apparatus 2 or the virtual camera 5 that is subjected to the image-based determination operation.

Further, if the detection area determination unit 314 determines that the abnormality is detected, the external output unit 332 outputs an abnormal-detection signal to the external device 10.

As described above, the first control unit 316 displays the frame indicating the detection area 570 using the specific color different from the color used for the normal state and using the specific frame line different from the frame line used for the normal state to indicate that the abnormality is detected at the detection area 570. With this configuration, among the image-based determination operation (monitoring operation) performed for each one of the image display sections 401, the user can visually recognize the timing of detecting the abnormality at which detection area of which image display section 401.

(Virtual Camera as Image-Based Determination System)

Figure 10:
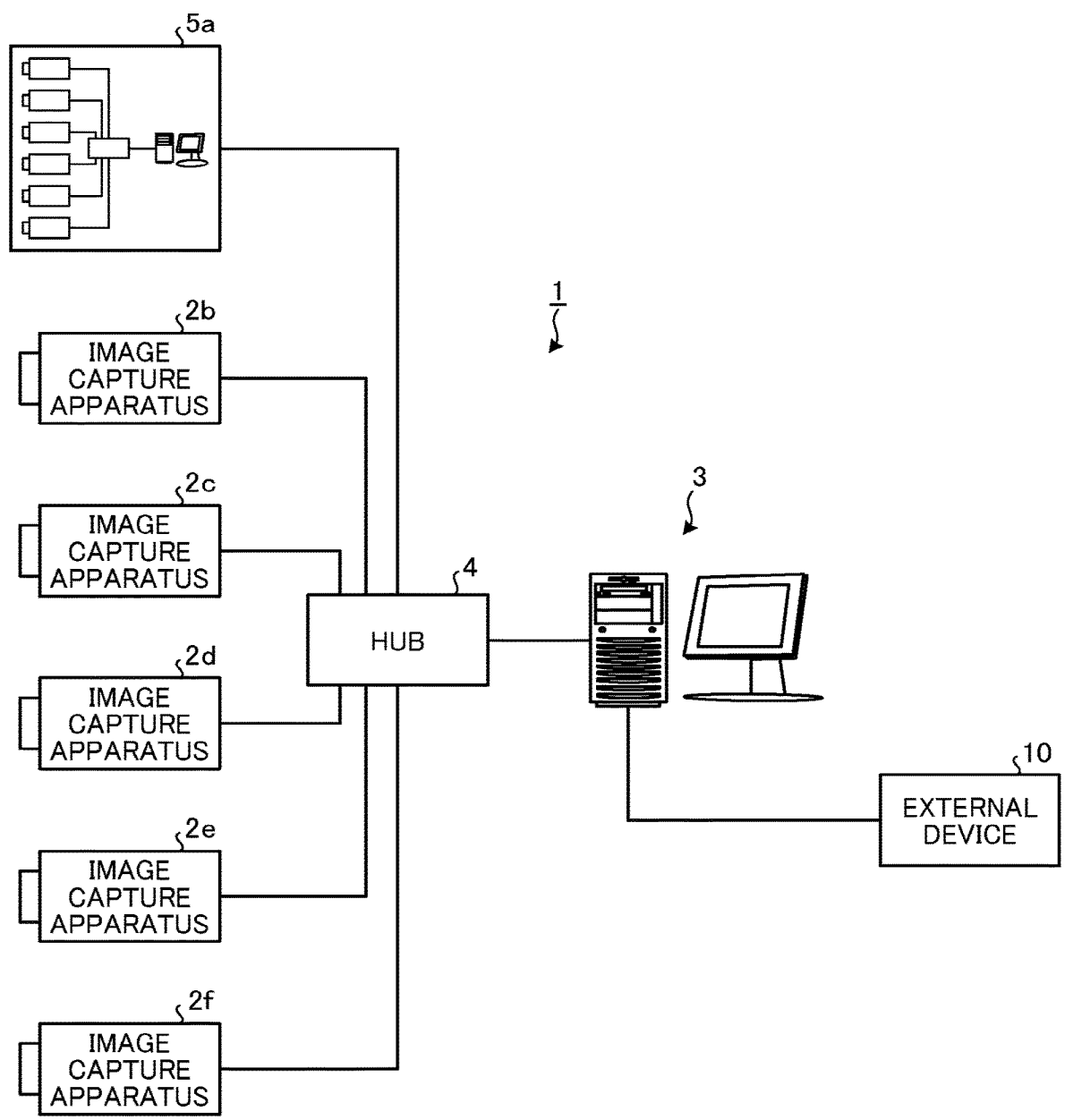
FIG. 10 is an example of a schematic configuration of an image-based determination system according to the embodiment, in which a virtual camera is used as another image-based determination system.

FIG. 10 is an example of a schematic configuration of the image-based determination system according to the embodiment, in which the virtual camera is used as another image-based determination system.

Figures 11A, 11B:
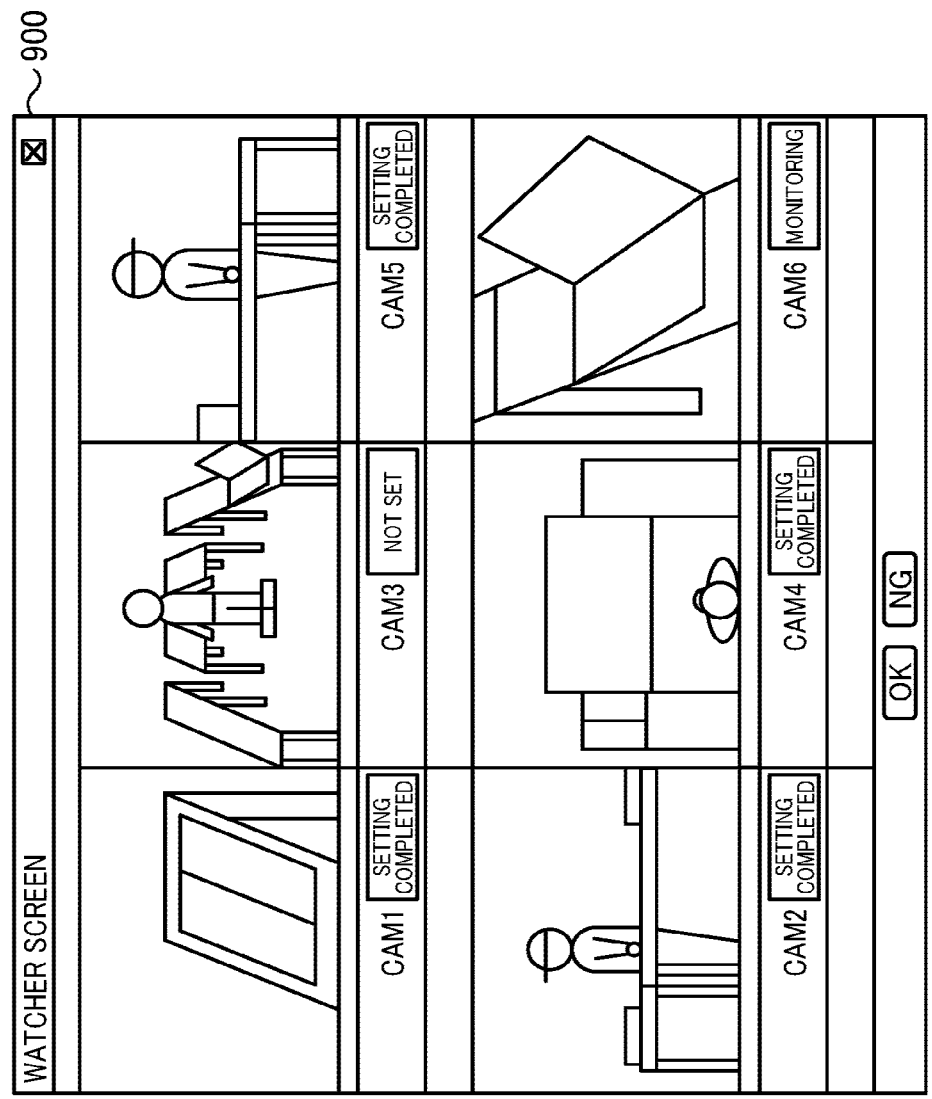
FIGS. 11A and 11B (FIG. 11) is an example of a watcher screen being displayed on a display device of the information processing apparatus according to the embodiment, in which a watcher screen output from a virtual camera used as another image-based determination system is displayed on a display device of the information processing apparatus.

FIGS. 11A and 11B (FIG. 11) is an example of a watcher screen being displayed on a display device of the information processing apparatus 3 according to the embodiment, in which a watcher screen output from the virtual camera used as another image-based determination system is displayed.

Hereinafter, with reference to FIGS. 10 and 11, a description is given of configuration and operation when another image-based determination system such as the virtual camera 5 is connected in the image-based determination system 1 according to the embodiment.

As illustrated in FIG. 10, as to the image-based determination system 1 according to the embodiment, the virtual camera 5 (see FIG. 1) is used as another image-based determination system 5a, compatible to the configuration of the image-based determination system 1, is connected to the information processing apparatus 3 via the hub 4.

An information processing apparatus included in the image-based determination system 5a (corresponding to the information processing apparatus 3 of the image-based determination system 1) receives image data from a plurality of IP cameras (corresponding to the image capture apparatuses 2 used for the image-based determination system 1) as similar to the image-based determination system 1, displays, for example, a screen corresponding to the watcher screen 400 on a display (corresponding to the display 105), and performs the image-based determination operation for the image data received from each of the IP cameras as similar to the image-based determination system 1.

Further, the information processing apparatus included in the image-based determination system 5a is installed with an application (hereinafter, distribution application) that captures images displayed on the display (e.g., screen corresponding to of the watcher screen 400), and converts the image to movie image using movie image compression standards, such as Motion JPEG or H.264. and outputs the movie image.

As illustrated in FIGS. 11A and 11B, the information processing apparatus included in the image-based determination system 5a uses the function of the distribution application to capture images of a watcher screen 900 (corresponding to watcher screen 400) displayed on the display, and converts the image to movie image, and transmits the movie image (an example of second image data) to the information processing apparatus 3 via the hub 4. That is, the image-based determination system 5a is not the image capture apparatus such as the image capture apparatus 2, but is an apparatus or system that can output the image displayed on the display as the movie image. Therefore, by receiving the movie image (an example of second image data) equivalent to the image data of the image capture apparatus 2 (first image data), the image-based determination system 5a can perform the image-based determination operation of the movie image (an example of second image data) as similar to the image-based determination operation of the image data of the image capture apparatus 2 (first image data). The image-based determination system 5a corresponds to "another device (additional device)" in this description.

For example, as illustrated in FIGS. 11A and 11B, the detection area designation unit 309 designates detection areas 571 and 572 on the watcher screen 400 of the image-based determination system 1 as detection areas used for detecting abnormality on the movie image (captured movie image) indicating the watcher screen 900 output from the image-based determination system 5a and displayed on the image display section 401a. In an example case of FIGS. 11A and 11B, for the convenience of description, the OK lamp and the NG lamp included in the watcher screen 900 are displayed on the image display section 401a on the watcher screen 400 by changing the scale (enlarging the scale).

The detection area 571 is designated by including the OK lamp of the watcher screen 900 (corresponding to the OK lamp 414 on the watcher screen 400).

The detection area 572 is designated by including the NG lamp of the watcher screen 900 (corresponding to the NG lamp 415 on the watcher screen 400).

Then, for example, the detection area designation unit 309 extracts an image at the detection area 571 when the OK lamp of the watcher screen 900 is in the turned-off state as a detection reference image, and stores the detection reference image in the storage unit 302, and also stores information on the designated detection area 571 (e.g., location or position information such as location and shape, attribute information) in the storage unit 302.

Further, the detection area designation unit 309 extracts an image at the detection area 572 when the NG lamp of the watcher screen 900 is in the turned-off state as a detection reference image, and stores the detection reference image in the storage unit 302, and also stores information on the designated detection area 572 (e.g., location or position information such as location and shape, attribute information) in the storage unit 302.

As illustrated in FIGS. 11A and 11B, the watcher screen 400 displays the movie image received from the image-based determination system 5a such as the virtual camera 5 on the image display section 401a in real-time to display a state that the detection areas 571 and 572 are designated.

Then, the user operates the input unit 303 to press the image display section 401 (in this example case, image display section 401a) corresponding to the virtual camera 5 that a user wants to start the image-based determination operation (monitoring operation) to set the image display section 401 (in this example case, image display section 401a) at the selected state.

Then, if the monitor start button 411 is pressed in response to a user operation to the input unit 303, the first control unit 316 starts the image-based determination operation for the real-time movie image (captured movie image) of the image-based determination system 5a displayed on the image display section 401a.

Further, the first control unit 316 stores, in the storage unit 302, information on time (time information) when the monitoring operation is started in association with the image-based determination system 5a corresponding to the image display section 401a being at the selected state.

Further, if the monitor stop button 412 is pressed in response to a user operation to the input unit 303, the first control unit 316 stops the image-based determination operation for the image display section 401a being at the selected state, and stores information on time (time information) when the monitoring operation is stopped in the storage unit 302 in association with the image-based determination system 5a corresponding to the image display section 401a.

Then, the detection area determination unit 314 obtains or acquires the attribute information on the designated detection areas 571 and 572 from the storage unit 302. While the monitoring operation is being performed, the detection area determination unit 314 compares the detection reference image and the target image in the movie image at the designated detection areas 571 and 572 to perform the image-based determination operation.

Specifically, the detection area determination unit 314 compares the target image and the detection reference image at the designated detection areas 571 and 572 in the movie image to perform the image-based determination operation.

When the detection area determination unit 314 compares the detection reference image and the target image at the detection area to perform the image-based determination operation, and if the counted total number of pixels where the value difference becomes the sensitivity or more becomes the given threshold value or more set for the attribute information on the detection area 571, the detection area determination unit 314 determines that the OK lamp is turned on as the image-based determination result for the detection area 571.

Further, when the detection area determination unit 314 compares the detection reference image and the target image in the detection area to perform the image-based determination operation, and if the counted total number of pixels where the value difference becomes the sensitivity or more becomes less than the given threshold value set for the attribute information on the detection area 571, the detection area determination unit 314 determines that the OK lamp is not turned on as the image-based determination result for the detection area 571.

Similarly, when the detection area determination unit 314 compares the detection reference image and the target image in the detection area to perform the image-based determination operation, and if the counted total number of pixels where the value difference becomes the sensitivity or more becomes the given threshold value or more set for the attribute information on the detection area 572, the detection area determination unit 314 determines that the NG lamp is turned on as the image-based determination result for the detection area 572.

Further, when the detection area determination unit 314 compares the detection reference image and the target image in the detection area to perform the image-based determination operation, and if the counted total number of pixels where the value difference becomes the sensitivity or more becomes less than the given threshold value set for the attribute information on the detection area 572, the detection area determination unit 314 determines that the NG lamp is not turned on as the image-based determination result for the detection area 572.

Then, the detection area determination unit 314 stores information on detection time (time information) when the OK lamp or the NG lamp is turned on by performing the image-based determination operation in the storage unit 302 in association with the image-based determination system 5a.

Further, the detection area determination unit 314 writes the information on detection time (time information) when the OK lamp or the NG lamp is turned on by performing the image-based determination operation to a marker file stored in the storage unit 302 in association with the image-based determination system 5a.

Then, when the detection area determination unit 314 detects the abnormality (when the turning-on of NG lamp at the detection area 572 is detected), the external output unit 332 outputs an abnormal-detection signal to the external device 10.

As described above, if the image-based determination system 5a used as the virtual camera 5, which substitutes the image capture apparatus 2, is connected to the information processing apparatus 3 via the hub 4, even if a user does not know the details of how to use the image-based determination system 5a and how to set conditions of the image-based determination system 5a, the user can recognize the result of image-based determination operation performed by the image-based determination system 5a by monitoring the image-based determination operation for the movie image output from the image-based determination system 5a performed by the information processing apparatus 3 of the image-based determination system 1, at the information processing apparatus 3 in the image-based determination system 1.

(Configuration of Connecting Virtual Cameras as Multi-Stage Image-Based Determination Systems)

Figure 12:
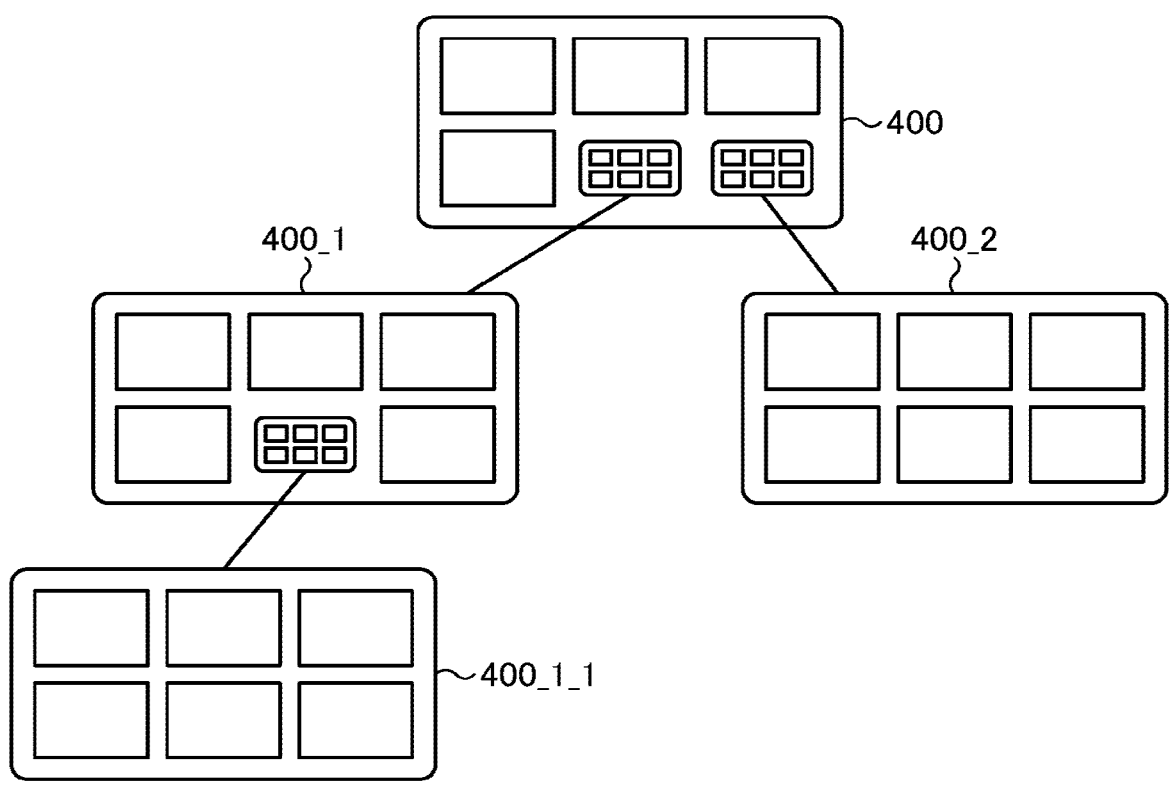
FIG. 12 illustrates a configuration of connecting virtual cameras as multi-stage image-based determination systems for the image-based determination system according to the embodiment.

FIG. 12 illustrates a configuration of connecting virtual cameras as multi-stage image-based determination systems for the image-based determination system according to the embodiment. Hereinafter, with reference to FIG. 12, a description is given of operation when another image-based determination systems, such as the virtual cameras 5, are connected in the multi-stage for the image-based determination system 1 according to the embodiment.

As described above with reference to FIGS. 10 and 11, when the virtual camera 5 connected to the information processing apparatus 3 is used as another image-based determination system employing the configuration, compatible to the configuration of the image-based determination system 1, still another image-based determination system can be connected to another image-based determination system, as a virtual camera using the multi-stage connection configuration.

For example, as illustrated in FIG. 12, as to the image-based determination system 1 that displays the watcher screen 400, one image-based determination system used as one virtual camera that displays a watcher screen 400_1, and another image-based determination system used as another virtual camera that displays a watcher screen 400_2 are connected. Further, as to the one image-based determination system that displays the watcher screen 400_1, still another mage-based determination system used as still another virtual camera that displays a watcher screen 400_1_1 is connected to the one image-based determination system that displays the watcher screen 400_1 using the multi-stage connection configuration.

As described above, if a virtual camera connected in the image-based determination system 1 is used as one image-based determination system, another virtual camera used as another image-based determination system can be connected to the virtual camera used as the one image-based determination system, in which the one image-based determination system and another image-based determination system are systems connected in the image-based determination system 1.

With this configuration, even if a user does not know how to use the multi-staged image-based determination systems and how to set conditions of the multi-staged image-based determination systems, when one image-based determination system having a higher level in the multi-stage connection configuration performs the image-based determination operation using the OK lamp or NG lamp on the watcher screen as the detection area, the user can recognize a result of the image-based determination operation performed at one image-based determination system having the lowest level in the multi-stage connection configuration by monitoring the image-based determination operation performed for the captured movie image at the image-based determination system 1 having the highest level in the multi-stage connection configuration, in which the information processing apparatus 3 may be used as the image-based determination system having the highest level.

(Playing of Image used for Image-Based Determination on Viewer Screen)

Figure 13:
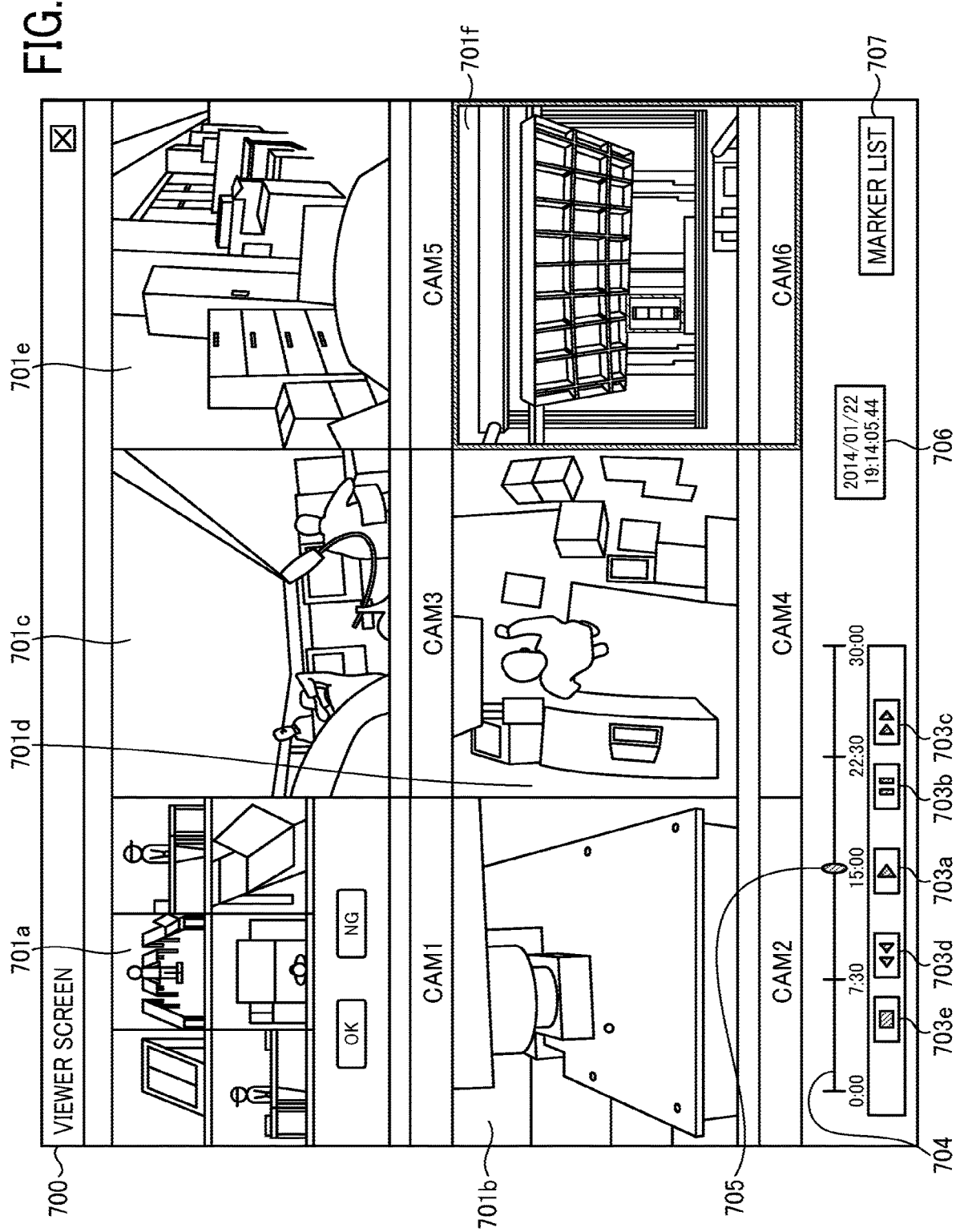
FIG. 13 illustrates an example of a state of playing and displaying recorded images using a viewer screen being displayed on a display device of the information processing apparatus according to the embodiment.

FIG. 13 illustrates an example of a state of playing and displaying recorded images using a viewer screen being displayed on a display device of the information processing apparatus 3 according to the embodiment.

Figure 14:
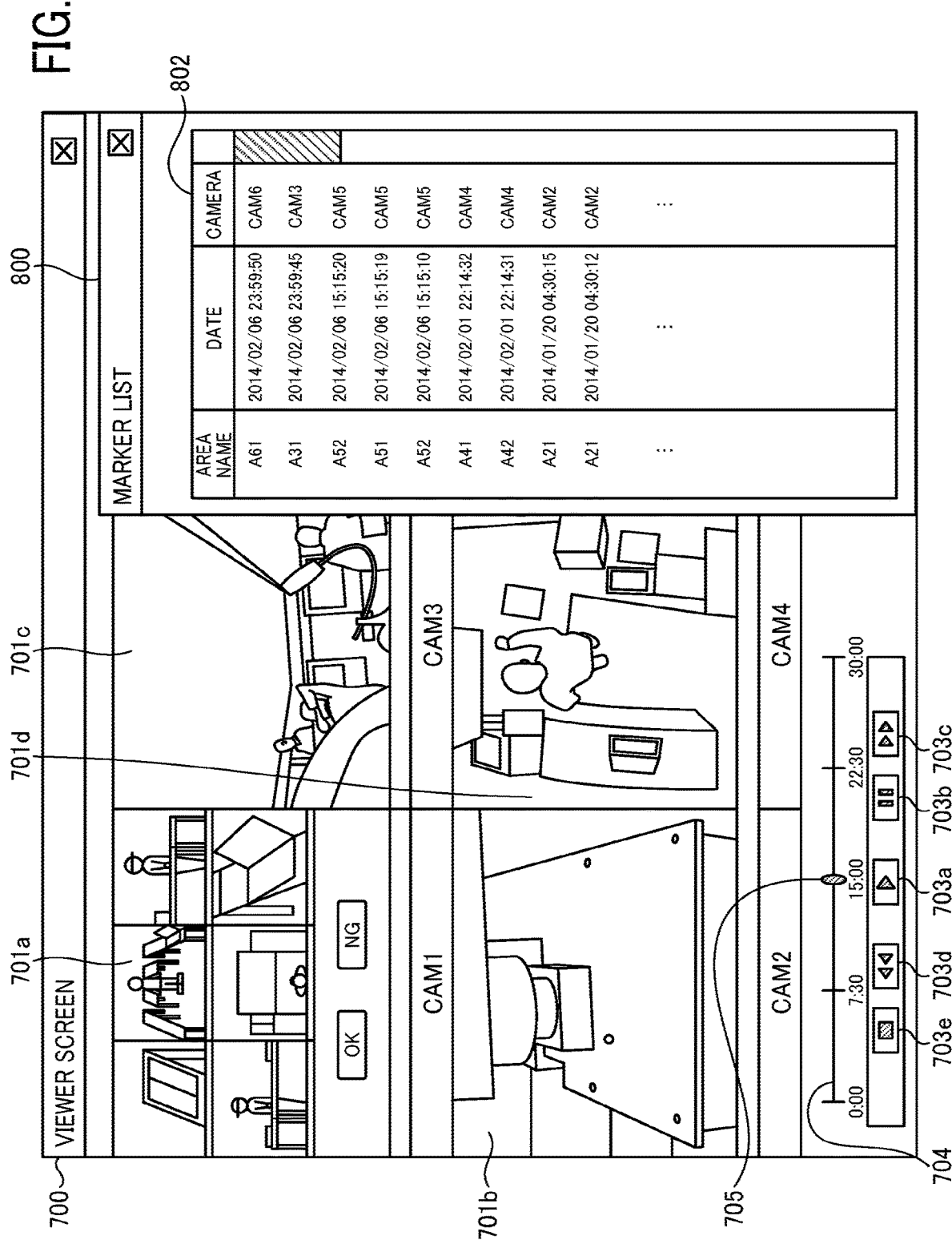
FIG. 14 illustrates an example of a state of displaying a marker list screen on a viewer screen being displayed on a display device of the information processing apparatus according to the embodiment.

FIG. 14 illustrates an example of a state of displaying a marker list screen on the viewer screen being displayed on the display device of the information processing apparatus 3 according to the embodiment.

Hereinafter, with reference to FIGS. 13 and 14, a description is given of a configuration of a viewer screen 700, and operation for displaying a plurality of images recorded or stored previously or in the past.

When the CPU 101 executes one or more programs (applications), the viewer screen 700 is displayed on the display unit 333 as illustrated in FIG. 13.

The viewer screen 700 is a screen used for displaying images corresponding to each state of the image-based determination operation for each one of the designated detection areas. Specifically, when the image data are received from the plurality of image capture apparatuses 2 and the image data are output from the virtual camera 5, the image data are stored in the storage unit 302. Then, the second play unit 318 read out past or previous image data stored in the storage unit 302, and the image distribution unit 312 distributes the past or previous image data to display the past or previous image data on the viewer screen 700 to reproduce or replay the state of the image-based determination operation for each one of the designated detection areas.

As illustrated in FIG. 13, the viewer screen 700 includes, for example, the image display sections 701a, 701b, 701c, 701d, 701e, and 701f (hereinafter, image display sections 701a to 701f), a play button 703a, a pause button 703b, a fast-forward button 703c, a fast-backward button 703d, a stop button 703e, a seek bar 704, a slider 705, a time display section 706, and a marker list button 707.

In response to receiving an operation signal from the input unit 303 operated by a user, the second play unit 318 displays the past or previous image data received from the plurality of image capture apparatuses 2 and the virtual camera 5 and stored in the storage unit 302, on the image display sections 701a to 701f, in which the image display sections 701a to 701f are used as the display areas.

Further, in this example case, it is assumed that the image display sections 701a to 701f display the image data having the same date and time.

Further, when each of the image display sections 701a to 701f is pressed in response to a user operation to the input unit 303 (e.g., click operation of the mouse 108), each of the image display sections 701a to 701f can be set at the selected state.

Further, the image display sections 701a to 701f may be collectively referred to as the "image display section 701" when not distinguishing the image display sections 701a to 701f.

When the play button 703a is pressed in response to a user operation to the input unit 303, the second play unit 318 starts to play the image data being displayed on the image display section 701.

When the pause button 703b is pressed in response to a user operation to the input unit 303, the second play unit 318 pauses the playing of the image data being played and displayed on the image display section 701.

When the fast-forward button 703c is pressed in response to a user operation to the input unit 303, the second play unit 318 plays the image data being played and displayed on the image display section 701 using the fast-forward displaying mode.

When the fast-backward button 703d is pressed in response to a user operation to the input unit 303, the second play unit 318 plays the image data being played and displayed on the image display section 701 using the fast-backward displaying mode.

When the stop button 703e is pressed in response to a user operation to the input unit 303, the second play unit 318 stops the image data being played and displayed on the image display section 701.

The seek bar 704 is provided with the slider 705 having a rod-like shape on the seek bar 704, in which a position of the slider 705 on the seek bar 704 indicates a specific time for the image data being played and displayed on the image display section 701.

The slider 705 can slide to any position on the seek bar 704 corresponding to a specific time when the image data being played and displayed on the image display section 701 was captured (e.g., specific time at which the displayed frame was captured, specific time at which the displayed image was acquired). The slider 705 having the rod-like shape can be used as an operation member.

Further, when the slider 705 slides on the seek bar 704 in response to a user operation to the input unit 303, the second play unit 318 displays, on the image display section 701, the image data, such as frame or image, corresponding to the position of the slider 705 on the seek bar 704.

The time display section 706 displays specific image capture date (including date of acquisition) and specific image capture time of the image data being played and displayed on the image display section 701 by the second play unit 318. The time display section 706 is used as the time display means.

When the marker list button 707 is pressed in response to a user operation to the input unit 303, the list control unit 320 reads out a marker file stored in the storage unit 302, and displays contents of the read-out marker file as the marker list screen 800 as illustrated in FIG. 14.

When the second play unit 318 displays the past or previous image data stored in the storage unit 302, on the image display section 701 of the viewer screen 700, the area display control unit 319 reads out information on time indicating a start and an end of the image-based determination operation (monitoring operation), information on time at which each detection area was designated, and information on time of detecting the state at each detection area, stored in the storage unit 302.

As illustrated in FIG. 13, the area display control unit 319 displays a frame indicating each detection area based on the above-mentioned time information by superimposing the frame over the past or previous image data being played and displayed on the image display section 701. For example, if it is determined that the time at which the detection area was designated is before the time when the image-based determination operation was started based on the above-mentioned time information, the area display control unit 319 displays the frame indicating the designated each detection area from the start time of the image-based determination operation.

Further, when the time of the image data being played and displayed on the image display section 701 becomes the time of ending the image-based determination operation set in the time information, the area display control unit 319 erases the frame indicating the each detection area displayed on the image display section 701.

Further, when the time of the image data being played and displayed on the image display section 701 becomes the time of detecting abnormality at a specific detection area set in the time information, the area display control unit 319 displays a frame indicating the specific detection area using a specific color different from a color used for the normal state and the frame line that is bolder or thicker than the frame line used for the normal state. For example, the area display control unit 319 displays the frame indicating each of the detection areas using, for example, a color of "red" and "thick line" as similar to the frame indicating each of the detection areas displayed on the watcher screen 400.

As described above, by controlling the displaying style of the frame indicating each detection area by the area display control unit 319 based on each time information stored in the storage unit 302, the state of the image-based determination operation (monitoring operation) on the watcher screen 400 can be reproduced using the past or previous image data stored in the storage unit 302. With this configuration, the user can check or confirm how the image-based determination operation was performed for the past or previous image data instead of the real-time image data.

Further, in this example case, it is assumed that the image display sections 701*a* to 701*f* display the image data having the same date and time, but is not limited thereto. For example, the seek bar and operation buttons can be set for each one of the image display sections 701*a* to 701*f*, with which image data of different dates and times can be respectively displayed on the image display sections 701*a* to 701*f*.

Further, when the marker list button 707 (FIG. 13) is pressed in response to a user operation to the input unit 303, the list control unit 320 reads out a maker file stored in the storage unit 302, and displays the marker list screen 800 indicating the contents of the marker file as illustrated in FIG. 14. As illustrated in FIG. 14, the marker list screen 800 includes, for example, a detection history display field 802 as a list.

The detection history display field 802 is an area of displaying a list of date and time when the detection was performed using the detection processing. Specifically, the detection history display field 802 displays, for example, area name of detection area, date and time of detection, and name identifying the corresponding image capture apparatus 2 and virtual camera 5.

When a record indicating any of the detection areas listed in the detection history display field 802 is pressed in response to a user operation to the input unit 303, the list control unit 320 instructs the second play unit 318 to display image data corresponding to the date and time indicated by the pressed record, on the image display section 701.

Thus, by displaying the marker list screen 800 (FIG. 14), the date and time of performing the detection at each detection area is displayed as the list, with which timing of occurrence of problems, tendency of occurrence of problems, or cause of occurrence of abnormality can be easily identified.

Further, when the virtual cameras 5 used as another image-based determination systems are connected as the multi-stage image-based determination systems as illustrated in FIG. 12, when a record listed in the detection history display field 802 on the watcher screen 400 is pressed, the second play unit 318 can play and display image data that was recorded using the watcher screens 400_1, 400_2, and 400_1_1.

As to the above described embodiment, the image-based determination system 1 includes the image capture apparatus 2 that outputs the captured image data directly, and also another device (virtual camera 5) that outputs the image data, to be used as the target image for determining the presence and absence of abnormality, with which the image-based determination operation can be performed on the image data output from the image capture apparatus 2, and also the image data acquired or obtained from the another device (virtual camera 5).

With this configuration, the target image subjected to the image-based determination operation is not limited to the image data captured by the image capture apparatus 2, but the image data acquired or obtained from another device, different from the image capture apparatus, can be subjected to the image-based determination operation.

As described above, if the image-based determination system 5*a* used as the virtual camera 5, which substitutes the image capture apparatus 2, is connected to the information processing apparatus 3 via the hub 4, even if a user does not know the details of how to use the image-based determination system 5a and how to set conditions of the image-based determination system 5a, the user can recognize the result of image-based determination operation performed by the image-based determination system 5a by monitoring the image-based determination system 1, which performs the image-based determination operation for the movie image output from the image-based determination system 5a using the information processing apparatus 3.

Further, when the virtual camera connected in the image-based determination system 1 is used as another image-based determination system, still another image-based determination system can be connected to another image-based determination system as still another virtual camera using the multi-stage connection configuration.

With this configuration, even if a user does not know how to use the multi-staged image-based determination systems and how to set conditions of the multi-staged image-based determination systems, when one image-based determination system having a higher level in the multi-stage connection configuration performs the image-based determination operation using the OK lamp or NG lamp on the watcher screen as the detection area, the user can recognize a result of the image-based determination operation performed at one image-based determination system having the lowest level in the multi-stage connection configuration by monitoring the image-based determination operation performed for the captured movie image at the image-based determination system 1 having the highest level in the multi-stage connection configuration, in which the information processing apparatus 3 may be used as the image-based determination system having the highest level.

Figure 11B:
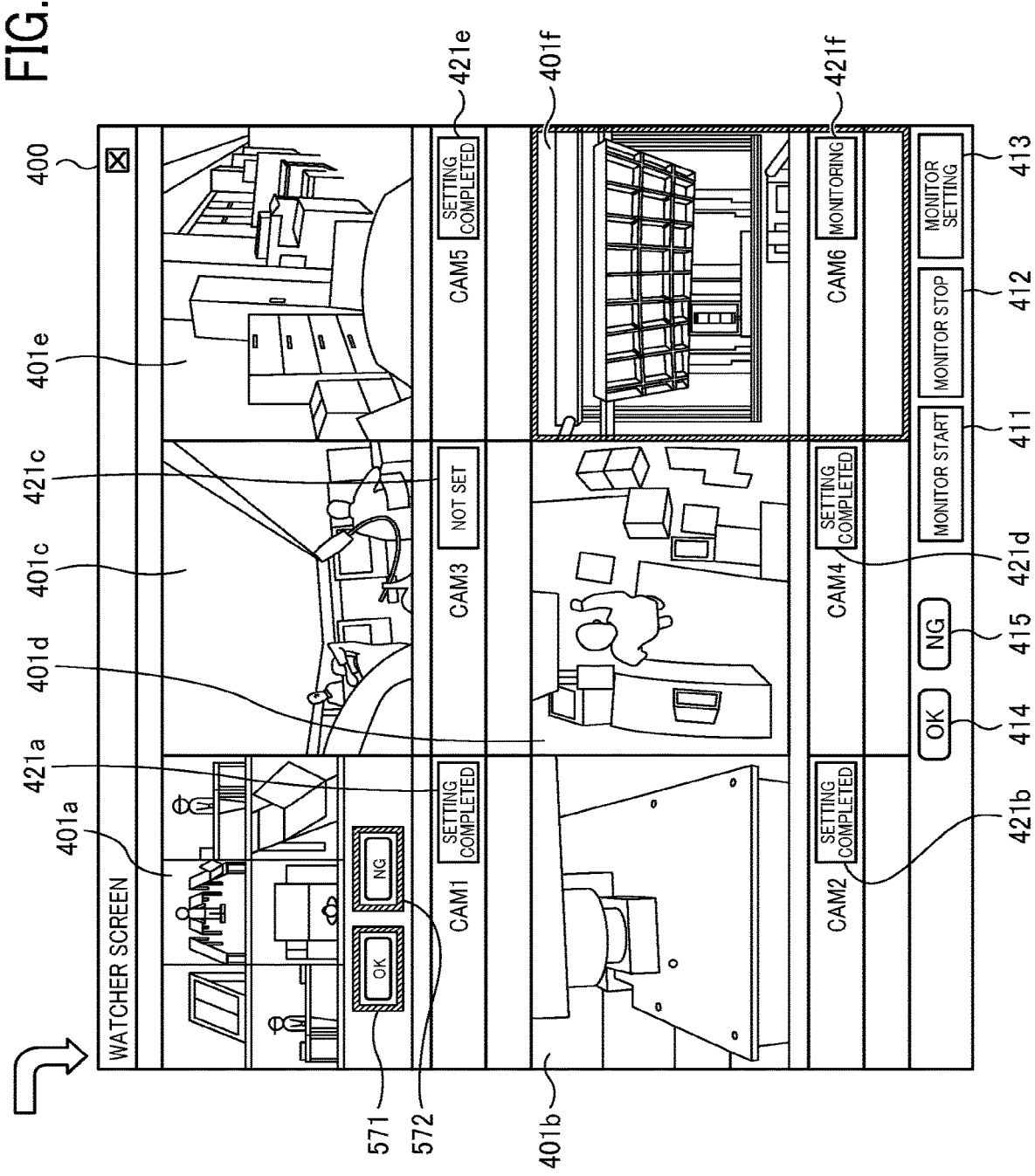

Further, as illustrated in FIG. 11, as to the image-based determination system 1 according to the embodiment, the distribution application of the image-based determination system 5a transmits the movie image by capturing the entire screen image displayed on the display (e.g., the watcher screen 900 displayed as the entire screen) to the information processing apparatus 3, but is not limited thereto. For example, the distribution application of the image-based determination system 5a may be configured to transmit a part of screen image displayed on the display (e.g., a part of image of the watcher screen 900 including the OK lamp and NG lamp), or an image that is generated by changing a layout of a part of screen image and combining the part of screen image to the information processing apparatus 3.

Further, as illustrated in FIG. 10, if the image-based determination system 5a is applied as the virtual camera 5, the information processing apparatus included in the image-based determination system 5a captures the screen image displayed on the display device of the virtual camera 5, and then transmits the captured screen image to the information processing apparatus 3, a given delay of reception time may occur at the information processing apparatus 3. When the delay of reception time occurs, the movie image received from the image-based determination system 5a and the image data received from the image capture apparatus 2 displayed on the watcher screen 400 have different time for the image data and the movie image displayed on the watcher screen 400. In the above described configuration, it can be configured that the above-mentioned reception time delay can be known and set in advance, with which the information processing apparatus 3 of the image-based determination system 1 can shift the display timing for the image data to be displayed on each image display section 401 of the watcher screen 400 based on the set reception time delay to set the same time for the image data and the movie image to be displayed on each image display section 401.

Modification Example 1

Hereinafter, with reference to FIG. 15, a description is given of an image-based determination system according to modification example 1 according to the embodiment, which is different from the image-based determination system 1 according to the above described embodiment.

In the above described embodiment, the virtual camera 5 used as another image-based determination system, different from the image-based determination system 1, is connected to the information processing apparatus 3 of the image-based determination system 1.

In the modification example 1, a system such as a virtual camera including an analog camera is connected to the information processing apparatus 3. Hereinafter, with reference to FIG. 15, a description is given of configuration and operation of the system such as the virtual camera including the analog camera. Further, the information processing apparatus 3 according to the modification example 1 employs the hardware configuration and functional configuration similar to those described in the above-described embodiment.

Figure 15:
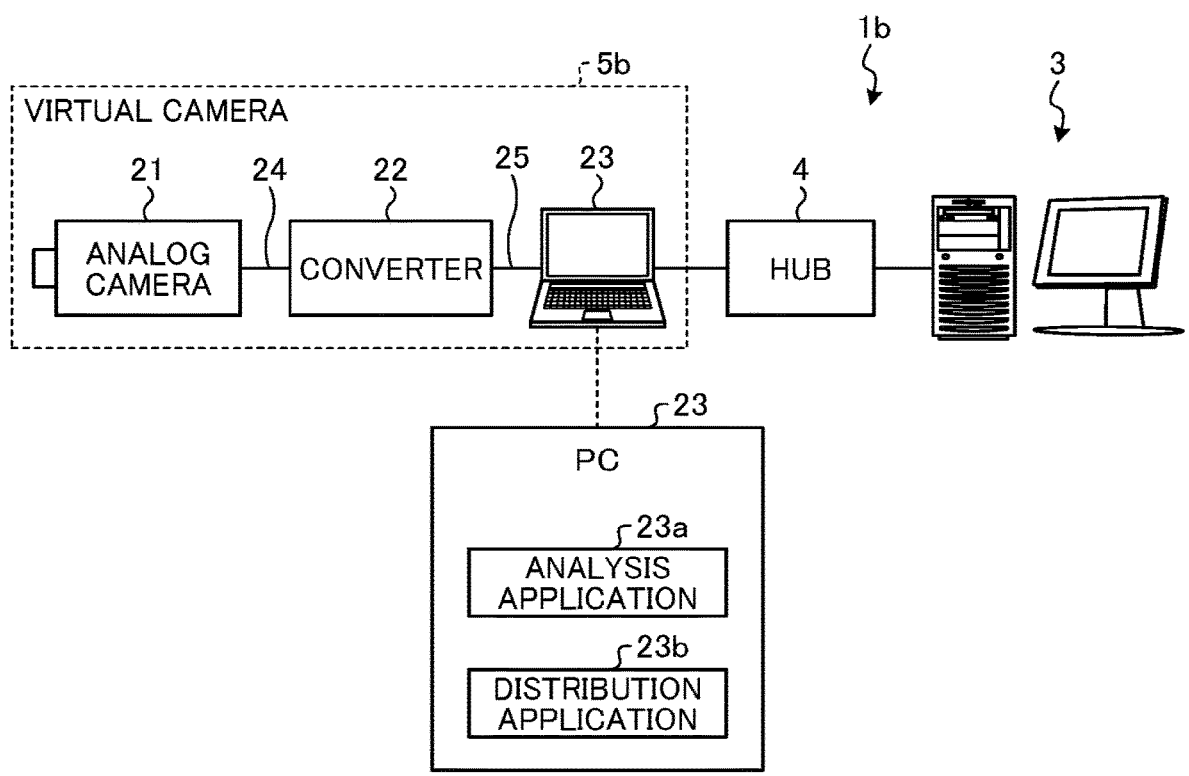
FIG. 15 is an example of schematic configuration of an image-based determination system according to modification example 1.

FIG. 15 is an example of schematic configuration of an image-based determination system 1b according to the modification example 1. Hereinafter, with reference to FIG. 15, a description is given of configuration and operation of the image-based determination system 1b.

As illustrated in FIG. 15, the image-based determination system 1b includes, for example, a virtual camera 5b, instead of the virtual camera 5 included in the image-based determination system 1 illustrated in FIG. 1. The virtual camera 5b is a system including an analog camera. Specifically, the virtual camera 5b includes, for example, an analog camera 21, a converter 22, and a personal computer (PC) 23 (an example of information processing apparatus). Further, in FIG. 15, the image capture apparatus 2 is omitted. The virtual camera 5b corresponds to "another device (additional device)" in this description.

The analog camera 21 is an analog camera that receives light from an object, converts the light into electric signals to capture an image of the object, and generates analog image signals.

The converter 22 receives the analog image signals from the analog camera 21 via an audio video (AV) cable 24, and converts the analog image signals into digital image data. Then, the converter 22 transmits the digital image data to the PC 23 via a universal serial bus (USB) cable 25. Further, the converter 22 is not limited to transmitting the digital image data to the PC 23 via the USB cable 25. For example, the converter 22 may transmit the digital image data to the PC 23 via high-definition multimedia interface (HDMI) cable.

The PC 23 is an information processing apparatus that performs given processing, such as analysis processing, on the digital image data, converted from the analog signals captured by the analog camera 21, by the converter 22. As illustrated in FIG. 15, the PC 23 is installed with analysis application 23a and distribution application 23b.

The analysis application 23a performs a given analysis on the image data received from the converter 22. Further, the analysis application 23a may be an application that performs playing and displaying of the image data, instead of analyzing the image data.

The distribution application 23b captures a screen image being displayed on a display of the PC 23, and converts the screen image using, for example, movie image compression standards, such as Motion JPEG or H.264, and transmits or distributes the movie image to the information processing apparatus 3 via the hub 4. Therefore, the PC 23 transmits the movie image of screen image (captured movie image) (an example of second image data) displayed on the display by reflecting a given analysis result obtained by executing the analysis application 23a (e.g., including displaying of playing of the image data) to the information processing apparatus 3 via the network I/F.

As described above, since the movie image of screen image being displayed on the display by reflecting the given analysis result to the image data corresponding to the analog image signals captured by the analog camera (e.g., including displaying of playing of the image data) can be transmitted to the information processing apparatus 3, the system employing the virtual camera including the analog camera illustrated in FIG. 15 can be applied as the virtual camera of this disclosure.

Modification Example 2

Hereinafter, with reference to FIG. 16, a description is given of an image-based determination system of modification example 2 according to the embodiment, different from the image-based determination system 1 according to the embodiment.

In the above described embodiment, the virtual camera 5 used as another image-based determination system, different from the image-based determination system 1, is connected to the information processing apparatus 3 of the image-based determination system 1.

In the modification example 2, a system such as a virtual camera including an industrial digital camera is connected to the information processing apparatus 3. Hereinafter, with reference to FIG. 16, a description is given of configuration and operation of the system such as the virtual camera including the industrial digital camera. Further, the information processing apparatus 3 according to the modification example 2 employs the hardware configuration and functional configuration similar to those described in the above-described embodiment.

Figure 16:
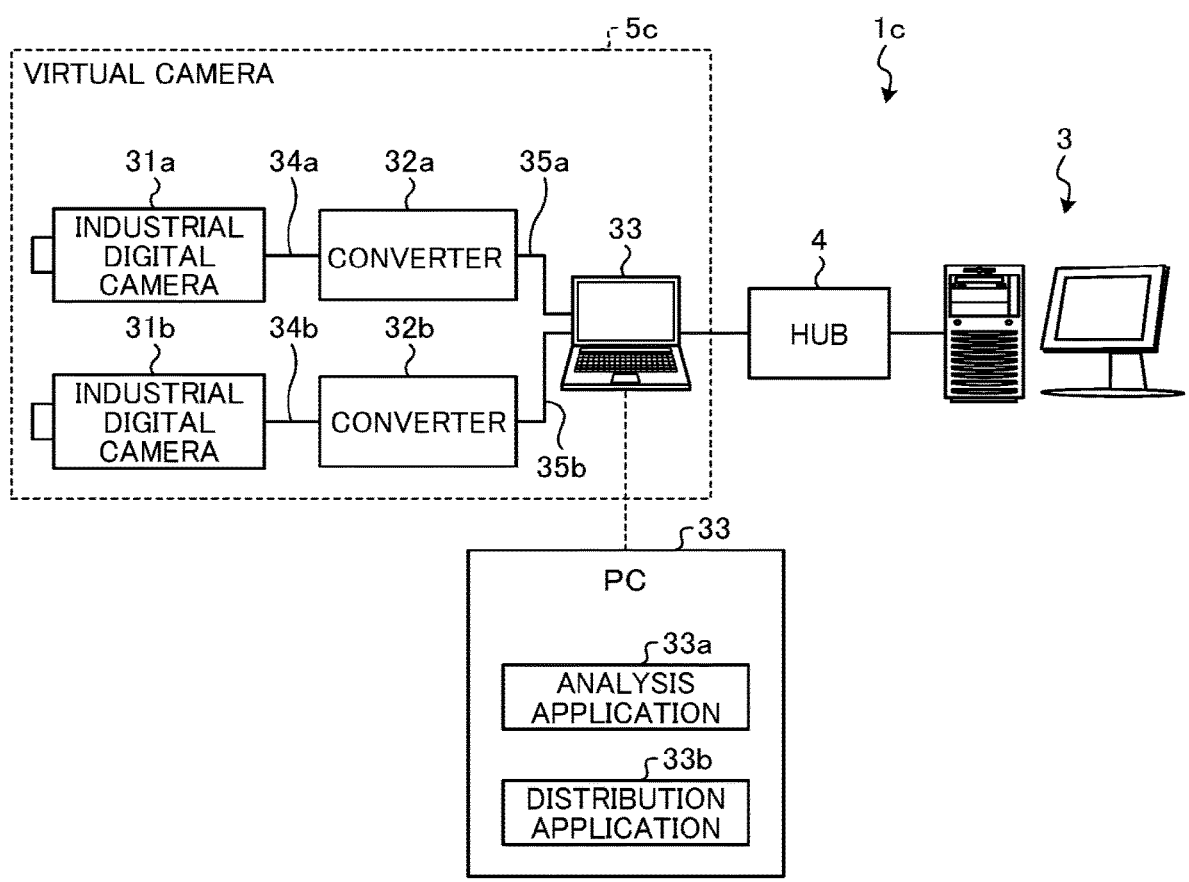
FIG. 16 is an example of schematic configuration of an image-based determination system according to modification example 2.

FIG. 16 is an example of schematic configuration of an image-based determination system 1c according to the modification example 2. Hereinafter, with reference to FIG. 16, a description is given of configuration and operation of the image-based determination system 1c according to the modification example 2.

As illustrated in FIG. 16, the image-based determination system 1c includes, for example, a virtual camera 5c, instead of the virtual camera 5 included in the image-based determination system 1 illustrated in FIG. 1. The virtual camera 5c is a system including an industrial digital camera. Specifically, the virtual camera 5c includes, for example, industrial digital cameras 31a and 31b (example of video camera or movie image camera), converters 32a and 32b, and a PC 33 (an example of information processing apparatus). Further, in FIG. 16, the image capture apparatus 2 is omitted. The virtual camera 5c corresponds to "another device (additional device)" in this description.

Each of the industrial digital cameras 31a and 31b is a digital camera that receives light from an object, converts the light into electric signals to capture an image of the object, and generates movie image composed of a plurality of frames (image data), such as 10 frames per second (FPS), as the image data referred to as the second image data in this description.

Each of the converters 32a and 32b converts the image data, captured by the industrial digital cameras 31a and 31b and then transmitted via HDMI cables 34a and 34b using HDMI standard, into image data transmittable using USB standard. Then, the converters 32a and 32b transmit the image data transmittable using USB standard to the PC 33 via USB cables 35a and 35b.

The PC 33 is an information processing apparatus that performs given processing, such as analysis processing, on the image data captured by the industrial digital cameras 31a and 31b. As illustrated in FIG. 16, the PC 33 is installed with analysis application 33a and distribution application 33b.

The analysis application 33a performs a given analysis on the image data received from the converters 32a and 32b.

The distribution application 33b captures a screen image being displayed on a display of the PC 33, and converts the screen image using, for example, movie image compression standards, such as Motion JPEG or H.264, and transmits or distributes the movie image to the information processing apparatus 3 via the hub 4. Therefore, the PC 33 transmits the movie image of screen image (captured movie image) (an example of second image data) displayed on the display by reflecting a given analysis result obtained by executing the analysis application 33a (e.g., including displaying of playing of the image data) to the information processing apparatus 3 via the network I/F.

As described above, since the movie image of screen image being displayed on the display by reflecting the given analysis result to the image data captured by the industrial digital cameras (e.g., including displaying of playing of the image data) can be transmitted to the information processing apparatus 3, the system employing the virtual camera including the industrial digital cameras illustrated in FIG. 16 can be applied as the virtual camera of this disclosure.

Further, as to the PC 33, if the analysis application 33a performs analysis processing on the image data received from the industrial digital cameras 31a and 31b and does not store the image data in a storage device, the system including the industrial digital cameras 31a and 31b is connected to the information processing apparatus 3 as the virtual camera to store the image data, such as movie image obtained from the virtual camera, in the storage unit 302.

Then, the area display control unit 319 can reproduce the state of the image-based determination operation (monitoring operation) on the watcher screen 400 based on the past or previous image data stored in the storage unit 302.

With this configuration, the user can check or confirm how the analysis application 33a has performed the analysis processing based on the past or previous image data captured by the virtual camera 5c.

Further, even if a user does not know the details of the system including the industrial digital cameras 31a and 31b, such as how to use the analysis application 33a and how to set conditions of the analysis application 33a, the user can recognize the result of analysis performed by using the virtual camera 5c by monitoring the result of image-based determination operation performed at the information processing apparatus 3 for the image data output from the virtual camera 5c.

Modification Example 3

Hereinafter, with reference to FIGS. 17A and 17B, a description is given of an image-based determination system of modification example 3 according to the embodiment, different from the image-based determination system 1 according to the embodiment.

In the above described embodiment, the virtual camera 5 used as another image-based determination system, different from the image-based determination system 1, is connected to the information processing apparatus 3 of the image-based determination system 1.

In the modification example 3, a system such as a virtual camera including an information processing apparatus for displaying analysis results obtained by executing an application is connected to the information processing apparatus 3. Hereinafter, with reference to FIGS. 17A and 17B, a description is given of configuration and operation of the system such as the virtual camera including the information processing apparatus for displaying analysis results obtained by executing the application. Further, the information processing apparatus 3 according to the modification example 3 employs the hardware configuration and functional configuration similar to those described in the above-described embodiment.

Figure 17A:
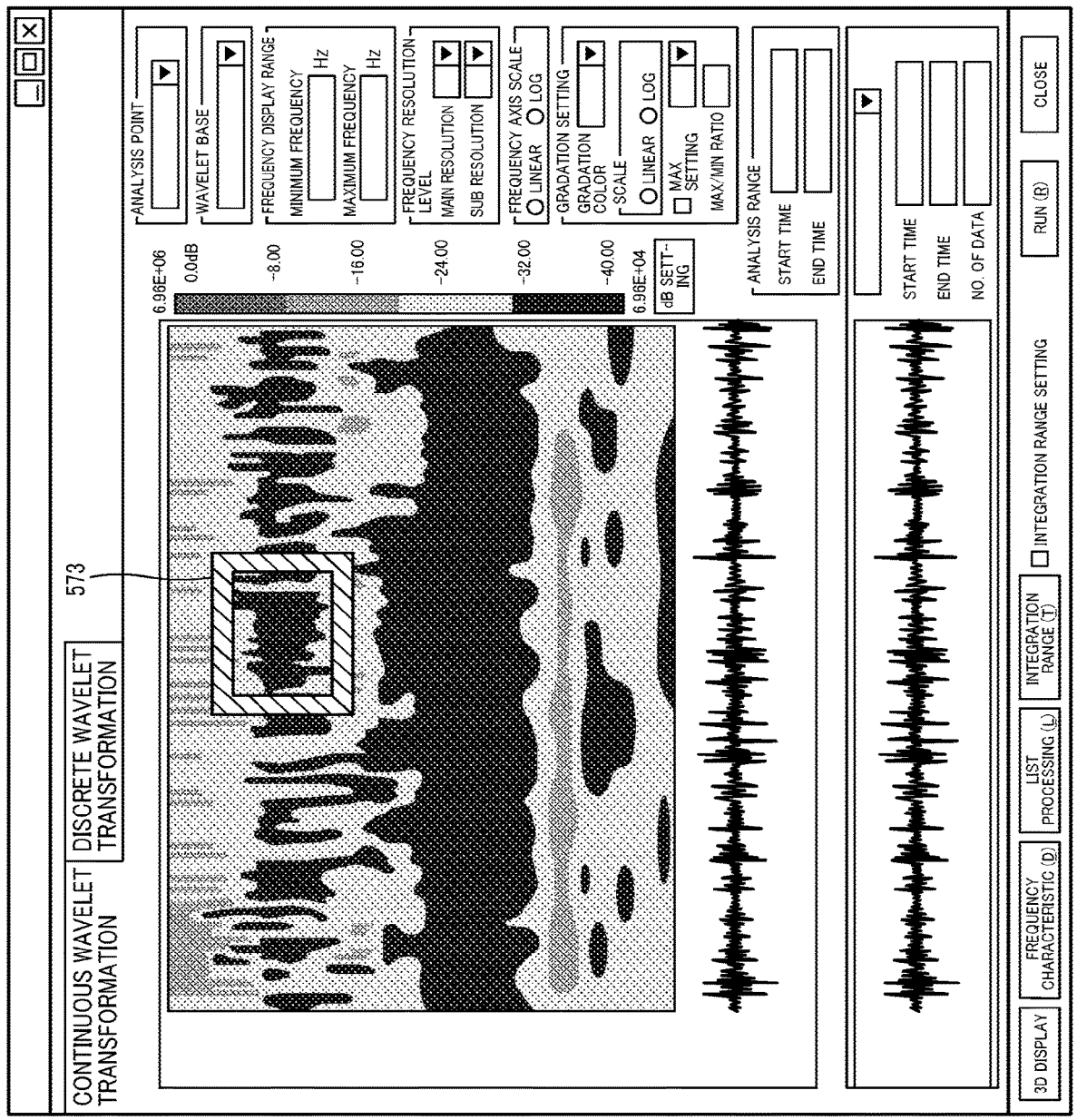
FIGS. 17A and 17B illustrate examples of images output by a virtual camera connected in an image-based determination system according to modification example 3, in which a software program is executed to visualize audio data as image data.
Figure 17B:
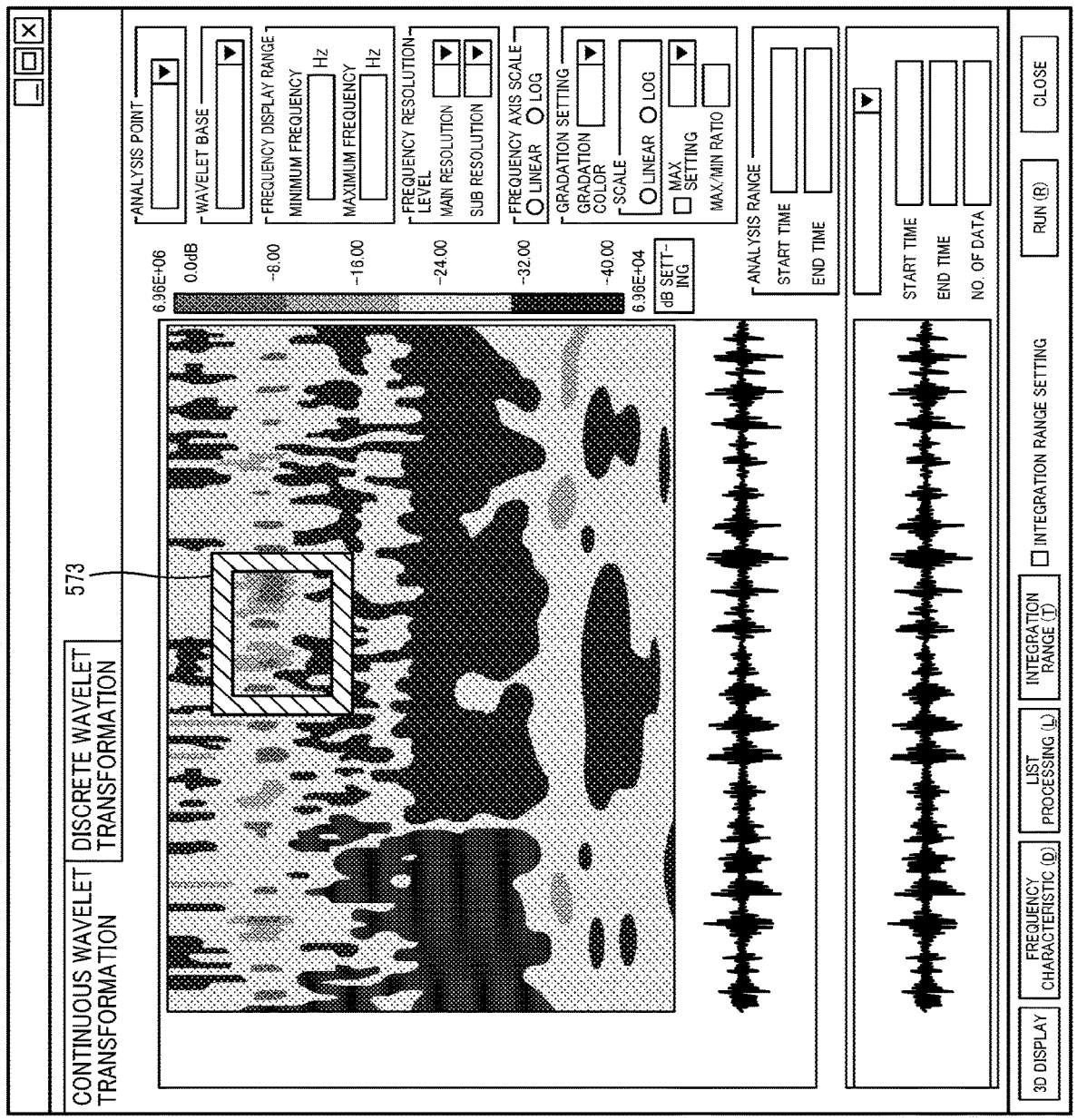

FIGS. 17A and 17B illustrate examples of images output by the virtual camera connected in the image-based determination system according to the modification example 3, in which a software program is executed to visualize audio data as image data. Hereinafter, with reference to FIGS. 17A and 17B, a description is given of an example of the system including an information processing apparatus used for displaying analysis results obtained by executing the application, as the virtual camera.

As to the modification example 3, the virtual camera may include an information processing apparatus installed with, for example, an analysis application that performs wavelet transformation on waveform data, such as vibration data or sound data, and expresses the waveform data using colors as illustrated in FIGS. 17A and 17B.

Then, a distribution application installed on the information processing apparatus transmits an application screen image of wavelet-transformed waveform data expressed in the colors illustrated in FIGS. 17A and 17B to the information processing apparatus 3 as a movie image of captured application screen image (an example of second image data) via the hub 4.

With this configuration, the application screen images illustrated in FIGS. 17A and 17B are displayed on the watcher screen 400 displayed on the display unit 333 of the information processing apparatus 3. Then, a detection area 573 can be designated for the waveform data displayed on the application screen image by the detection area designation unit 309 as illustrated in FIGS. 17A and 17B.

For example, as to the setting contents of the detection area 573 (contents according to the settings set on the setting screen 500), as illustrated in FIG. 17A, waveform data of good quality has a smaller red distribution, and as illustrated in FIG. 17B, waveform data of defective quality has a larger red distribution, and thereby the image having the smaller red distribution is set as a detection reference image.

With this configuration, when the image-based determination operation is performed using the watcher screen 400, by comparing the target image and the above-described detection reference image at the detection area 573, the waveform data of defective quality can be detected.

That is, even if a user does not know the details of the system including the information processing apparatus that displays the analysis results obtained by executing the application, such as how to use the system and how to set conditions of the system, the user can recognize the analysis result obtained by executing the analysis application by monitoring the result of image-based determination operation performed at the information processing apparatus 3 for the image data output from the virtual camera.

Further, the analysis result (see FIGS. 17A and 17B) obtained by executing the application (i.e., the analysis result obtained by the virtual camera alone) can be recognized in connection with the result of image-based determination operation performed at the information processing apparatus 3.

Modification Example 4

Hereinafter, with reference to FIG. 18, a description is given of an image-based determination system of modification example 4 according to the embodiment, different from the image-based determination system 1 according to the embodiment.

In the above described embodiment, the virtual camera 5 used as another image-based determination system, different from the image-based determination system 1, is connected to the information processing apparatus 3 of the image-based determination system 1.

In the modification example 4, a virtual camera, such as smart phone, transmits captured movie image to the information processing apparatus 3 using wireless communication. Hereinafter, with reference to FIG. 18, a description is given of configuration and operation of the virtual camera, such as smart phone, connected to the information processing apparatus 3 wirelessly. Further, the information processing apparatus 3 according to the modification example 4 employs the hardware configuration and functional configuration similar to those described in the above-described embodiment.

Figure 18:
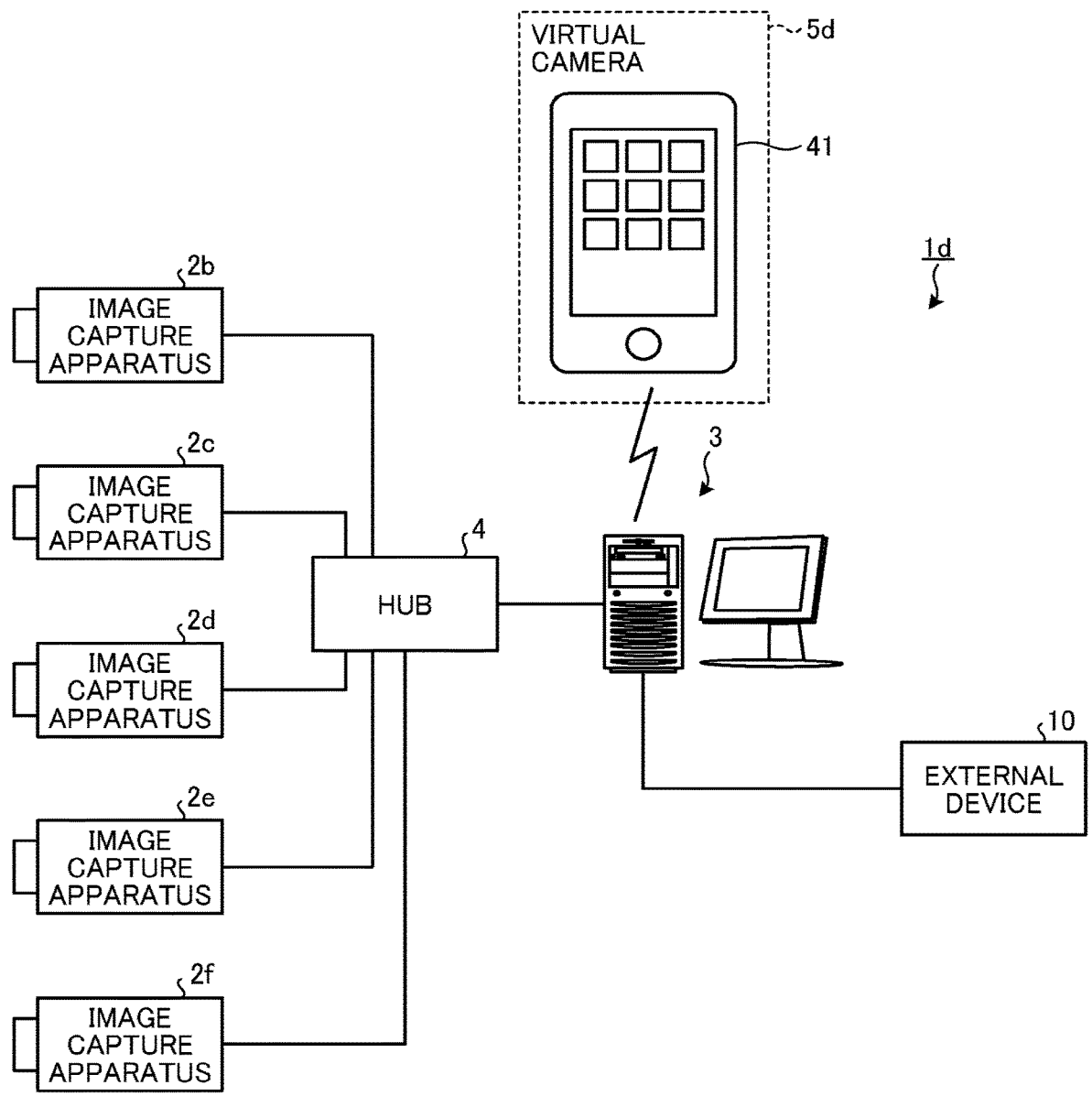
FIG. 18 is an example of schematic configuration of an image-based determination system according to modification example 4.

FIG. 18 is an example of schematic configuration of an image-based determination system 1*d* according to the modification example 4. Hereinafter, with reference to FIG. 18, a description is given of configuration and operation of the image-based determination system 1*d*.

As illustrated in FIG. 18, the image-based determination system 1*d* includes, for example, a virtual camera 5*d* such as a smart phone 41 (an example of wireless communication terminal), instead of the virtual camera 5 included in the image-based determination system 1 illustrated in FIG. 1. The virtual camera 5*d* corresponds to "another device (additional device)" in this description.

The smart phone 41 is installed with a distribution application that captures a screen image being displayed on a display of the smart phone 41, and converts the screen image using, for example, movie image compression standards, such as Motion JPEG or H.264, and transmits or distributes the movie image to an external apparatus. The distribution application transmits the captured movie image (an example of second image data) to the information processing apparatus 3 using a wireless I/F of the smart phone 41 and the communication standard, such as Wi-Fi. Further, as to the virtual camera 5*d* (information processing apparatus) connectable to the information processing apparatus 3 is not limited to the smart phone 41. For example, the virtual camera 5*d* can be tablet terminal or wirelessly communicable PC (an example of wireless communication terminal).

As described above, since the movie image captured from the screen image being displayed on the smart phone 41 can be transmitted to the information processing apparatus 3, the wireless communication terminal such as the smart phone 41 (see FIG. 18) can be applied as the virtual camera of this disclosure.

Further, the information processing apparatus 3 can perform the image-based determination operation for an application screen image being activated and displayed on the smart phone 41, or a screen image of photos captured by a camera disposed in the smart phone 41 to detect abnormality, such as abnormality on the screen image.

Modification Example 5

Hereinafter, with reference to FIGS. 19 (19(a) and 19(b)), a description is given of an image-based determination system of modification example 5 according to the embodiment, different from the image-based determination system 1 according to the embodiment.

In the above described embodiment, the virtual camera 5 used as another image-based determination system, different from the image-based determination system 1, is connected to the information processing apparatus 3 of the image-based determination system 1.

In the modification example 5, a virtual camera including an information processing apparatus for displaying results obtained by executing one or more software programs is connected to the information processing apparatus 3. Hereinafter, with reference to FIGS. 19 (19(a) and 19(b)), a description is given of configuration and operation of the system such as the virtual camera including the information processing apparatus for displaying results obtained by executing one or more software programs. Further, the information processing apparatus 3 according to the modification example 5 employs the hardware configuration and functional configuration similar to those described in the above-described embodiment.

Figure 19:
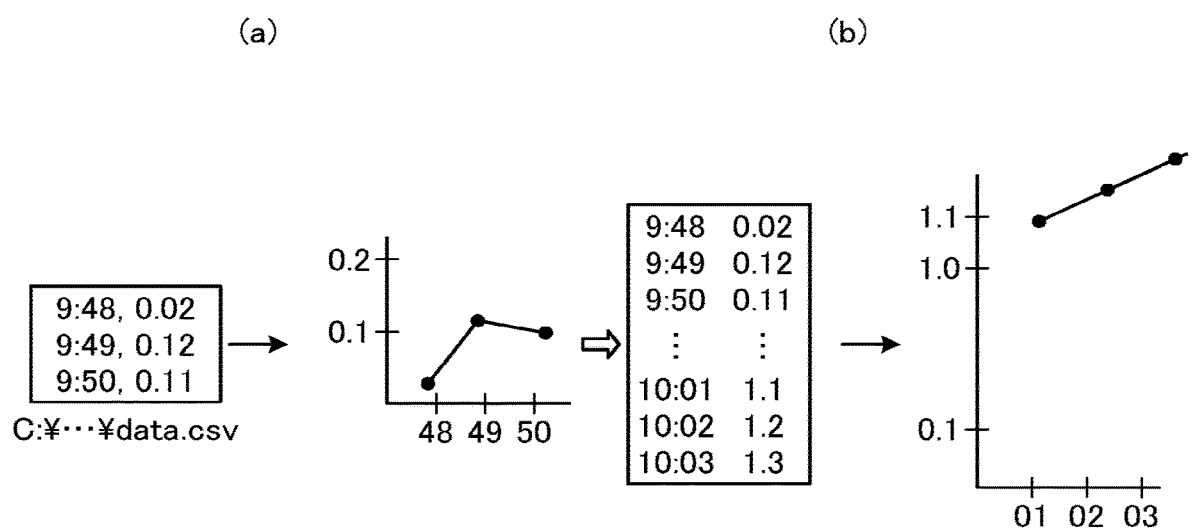
FIG. 19 illustrates examples of images output by a virtual camera connected in an image-based determination system according to modification example 5, in which a software program is executed to plot data as a graph.

FIGS. 19 (19(a) and 19(b)) illustrates examples of images output by a virtual camera connected in the image-based determination system according to the modification example 5, in which a software program is executed to plot data as a graph or profile. Hereinafter, with reference to FIGS. 19 (19(a) and 19(b)), a description is given of the virtual camera, which is the information processing apparatus (e.g., PC) that displays results obtained by executing the software program.

As to the modification example 5, for example, the virtual camera is an information processing apparatus that executes one or more software programs to automatically create a graph or profile by entering comma separated values (CSV) data generated by executing a particular application, and applies the updated CSV file data to the graph to update the graph or profile, as needed, as illustrated in FIGS. 19 (19(a) and 19(b)).

Further, the one or more software programs have a function of changing a color used for the graph or profile to a specific color, such as red, when a value of the updated graph or profile exceeds a given threshold value (e.g., see graph of FIG. 19(b)).

Then, the distribution application installed on the information processing apparatus transmits an application screen image, which is automatically created and updated as illustrated in FIGS. 19 (19(a) and 19(b)), to the information processing apparatus 3 as a movie image of captured application screen image (an example of second image data) via the hub 4.

With this configuration, the graphs or profiles illustrated in FIGS. 19 (19(a) and 19(b)) are displayed on the watcher screen 400 displayed on the display unit 333 of the information processing apparatus 3. Then, an area including the graph can be designated a detection area by the detection area designation unit 309. In this case, the contents of the detection area (contents according to the settings set on the setting screen 500) are used to set an image having a smaller red distribution as a detection reference image.

With this configuration, when the image-based determination operation is performed using the watcher screen 400, by comparing the target image and the above-described detection reference image at the detection area, a state that the value of graph exceeds the threshold value can be detected.

As described above, since the movie image of screen image displayed on a display of the information processing apparatus (e.g., PC) by reflecting a given result obtained by executing the software program can be transmitted to the information processing apparatus 3, the system employing the information processing apparatus (e.g., PC) for displaying results obtained by executing the software program can be applied as the virtual camera of this disclosure.

Further, even if a user does not know the details of how to use the information processing apparatus (e.g., PC) used for displaying results obtained by executing the software program and how to set conditions of the information processing apparatus (e.g., PC), the user can recognize the result of graph created by executing the software program by monitoring the result of image-based determination operation performed at the information processing apparatus 3 for the movie image output from the virtual camera.

Modification Example 6

Hereinafter, with reference to FIGS. 20A, 20B, and 20C, a description is given of an image-based determination system of modification example 6 according to the embodiment, different from the image-based determination system 1 according to the embodiment.

In the above described embodiment, the virtual camera 5 used as another image-based determination system, different from the image-based determination system 1, is connected to the information processing apparatus 3 of the image-based determination system 1.

In the modification example 6, a system such as a virtual camera including an information processing apparatus for performing given image processing on image data captured by an image capture apparatus is connected to the information processing apparatus 3 wirelessly. Hereinafter, with reference to FIGS. 20A, 20B, and 20C, a description is given of configuration and operation of the system such as the virtual camera including the information processing apparatus. Further, the information processing apparatus 3 according to the modification example 6 employs the hardware configuration and functional configuration similar to those described in the above-described embodiment.

Figure 20A:
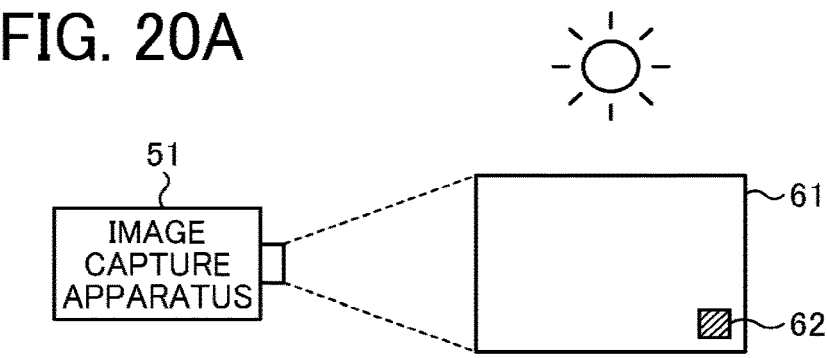
FIGS. 20A, 20B, and 20C illustrate an example of schematic configuration of an image-based determination system according to modification example 6.
Figure 20B:
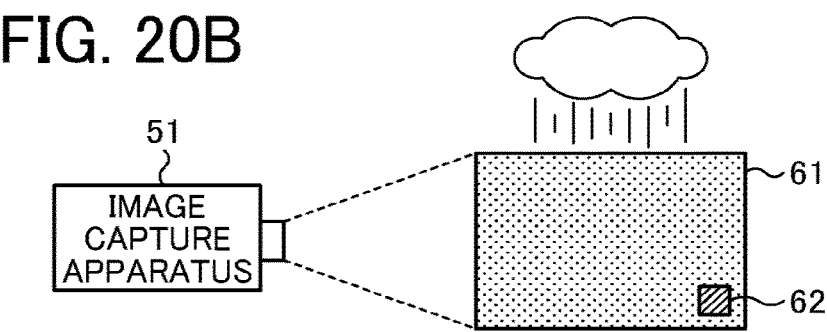
Figure 20C:
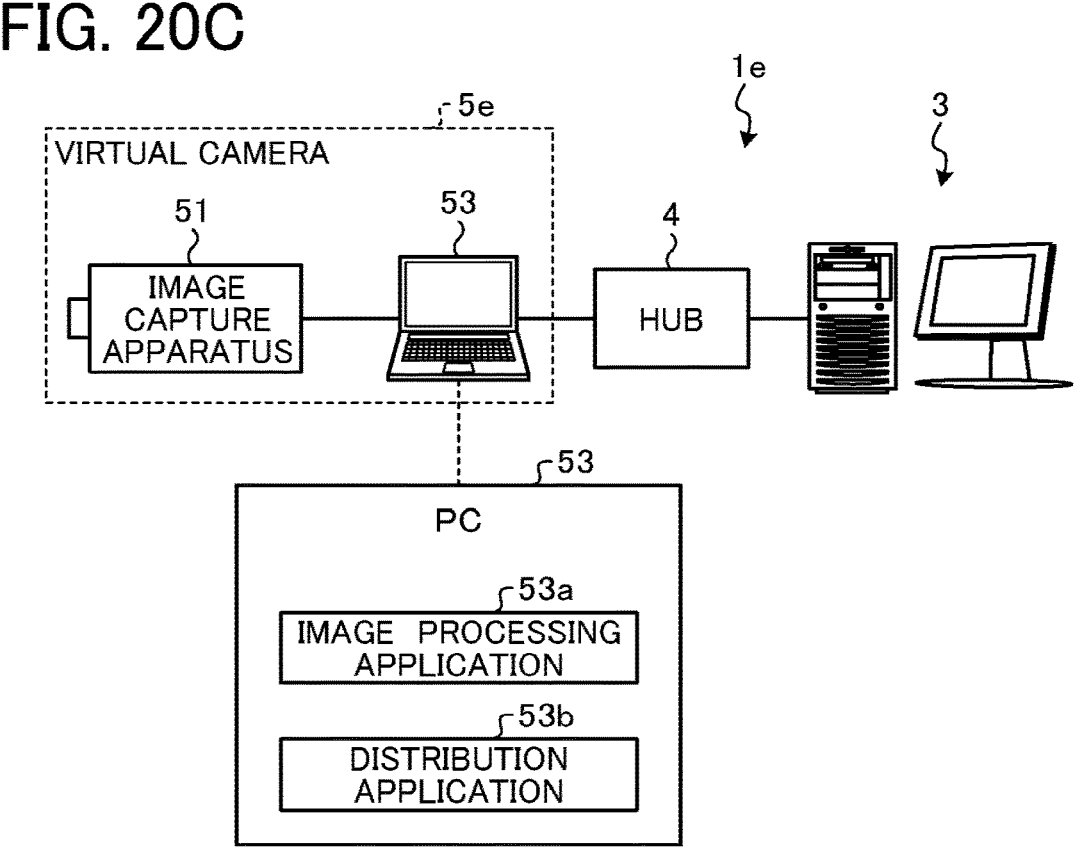

FIGS. 20A, 20B, and 20C illustrate an example of schematic configuration of an image-based determination system 1e according to the modification example 6. Hereinafter, with reference to FIGS. 20A, 20B, and 20C, a description is given of configuration and operation of the image-based determination system 1e according to the modification example 6.

As illustrated in FIGS. 20A and 20B, an image of an object 61 captured by an image capture apparatus 51 becomes brighter or darker image depending on ambient environment conditions (e.g., weather, time, season) when the image of an object 61 is captured. For example, as illustrated in FIG. 20A, when the image of the object 61 is captured by the image capture apparatus 51 under a sunny weather condition, a brighter image is acquired, and as illustrated in FIG. 20B, when the image of the object 61 is captured by the image capture apparatus 51 under a rainy weather condition, a darker image is acquired.

In this situation, the image data captured by the image capture apparatus 51 under a particular ambient environment condition (e.g., sunny weather) may be transmitted to the information processing apparatus 3, and then a particular image of a detection area designated on the setting screen is determined or fixed as the detection reference image to perform the image-based determination operation. However, if this detection reference image is used for performing the image-based determination operation on the image data captured by the image capture apparatus 51 under a different ambient environment condition (e.g., rainy weather), an erroneous determination result may be obtained.

Therefore, as to the modification example 6, a part of the image (i.e., partial image) of the object 61 captured by the image capture apparatus 51 (first captured image) under a specific environment condition (e.g., sunny weather indicated in FIG. 20A) is registered as a reference portion 62 (i.e., reference image 62) used for adjusting environmental effect.

After the registration of the reference portion 62 of the first captured image, another image of the object 61 is captured by the image capture apparatus 51 (second captured image) under a specific different environment condition (e.g., rainy weather indicated in FIG. 20B).

Then, a change of the brightness and chroma of the image at a position of the reference portion 62 of the second captured image captured under the specific different environment condition with respect to a position of the reference portion 62 of the first captured image is calculated to determine a conversion formula to match the brightness and chroma of the reference portion 62 of the second captured image to the brightness and chroma (i.e., color) of the reference portion 62 of the first captured image, and then the conversion formula is applied to the entire second captured image to obtain the image (movie image data) having reduced an effect of change of environmental conditions.

As illustrated in FIG. 20C, the image-based determination system 1e includes, for example, a virtual camera 5e, instead of the virtual camera 5 included in the image-based determination system 1 illustrated in FIG. 1.

The virtual camera 5e is a system including an image capture apparatus that performs given image processing on image data captured by an image capture apparatus. Specifically, the virtual camera 5e includes, for example, an image capture apparatus 51 and a PC 53 (an example of information processing apparatus). Further, in FIG. 20C, the image capture apparatus 2 is omitted. The virtual camera 5e corresponds to another device according to the present invention.

The image capture apparatus 51 is, for example, a digital camera that receives light from an object, converts the light into electric signals to capture an image of the object, and generates movie image composed of a plurality of frames (image data), such as 10 frames per second (FPS), as the image data referred to as the second image data in this description.

As described above, the PC 53 is an information processing apparatus that registers the reference portion 62 after capturing one image by the image capture apparatus 51 (first captured image) under one environment condition. When another image of the object 61 is captured by the image capture apparatus 51 (second captured image) under another environment condition, the PC 53 calculates the change of the brightness and chroma of the image at the position of the reference portion 62 of the second captured image with respect to the position of the reference portion 62 of the first captured image to determine the conversion formula to match the brightness and chroma of the reference portion 62 of the second captured image to the brightness and chroma (i.e., color) of the reference portion 62 of the first captured image, and then the PC 53 applies the conversion formula to the entire second captured image to perform the image processing of reducing an effect of change of environmental conditions. As illustrated in FIG. 20C, the PC 53 is installed with image processing application 53a and distribution application 53b.

The image processing application 53a is an application used for performing the above-described image processing.

The distribution application 53b captures a screen image being displayed on a display of the PC 53, and converts the screen image using, for example, movie image compression standards, such as Motion JPEG or H.264, and transmits or distributes the movie image to the information processing apparatus 3 via the hub 4. Therefore, the PC 53 transmits the movie image of screen image (captured movie image) (an example of second image data), corresponding to the image data having received the image processing performed by the image processing application 53a, displayed on the display, to the information processing apparatus 3 via the network I/F.

As described above, since the movie image of the screen image displayed on the display, having received the image processing to the image data captured by the image capture apparatus 51 for reducing the effect of change of environmental conditions, can be transmitted to the information processing apparatus 3, the system including the information processing apparatus (PC 53) that performs the given image processing on the image data captured by the image capture apparatus 51 (see FIG. 20C) can be applied as the virtual camera of this disclosure.

With this configuration, the image-based determination operation can be performed at the information processing apparatus 3 for the image data having reduced the effect of change of environmental conditions, in which occurrence of the erroneous determination can be reduced.

Further, the virtual camera connected to the information processing apparatus 3 is not limited to the virtual cameras according to the above-described embodiment and modification examples. For example, the virtual camera can be a system used for imaging a thermography image to detect human body and monitoring heat source to prevent fire, a system used for imaging a depth sensor image for performing manual operation analysis, a system including Raspberry Pi for obtaining images via Wi-Fi, a system used for visualizing detection information of radiation sensor and alerting radiation, a system used for detecting human skeletal information for performing a work analysis, and a system used for detecting a personal movement information for performing work analysis, a system used for detecting gesture information by human hand for operating a PC, a system including a wearable camera used for obtaining or acquiring eye sight movement image, a system used for visualizing electrostatic generation in a process using electrostatic sensors and alerting electrostatic generation, a system used for obtaining or acquiring PC screen image for detecting business contents and performing a time analysis, and a system including monitoring cameras that can capture a plurality of 360-degree images for reducing blind spots.

Further, as to the above-described embodiment and modification examples, the watcher screen 400 displays the real-time image data and the viewer screen 700 displays the past or previous image data separately, but is not limited thereto. For example, the functions of the watcher screen 400 and the viewer screen 700 can be implemented using a common screen.

Further, as to each display area or section, such as the image display sections 401 and 701, in the above-described embodiment and modification examples, the frame is used as a display element for indicating each detection area, but is not limited thereto. For example, any display element that can indicate each detection area can be displayed on the display device.

As to the above described embodiments of the image-based determination apparatus and image-based determination system, the image data to be subjected to the image-based determination operation is not limited to the image data output from the image capture apparatuses but also the image data output from another device, different from the image capture apparatuses.

Further, each of the functions of the above-described embodiment and modification examples can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

Further, the programs executed by the information processing apparatus 3 according to the above-described embodiments and the modification examples may be configured to be recorded on a computer-readable recoding medium, such as compact disk read only memory (CD-ROM), flexible disk (FD), compact disk-recordable (CD-R), digital versatile disc (DVD) or secure digital (SD) card, as files in an installable format or executable format.

Further, the programs executed by the information processing apparatus 3 according to the above-described and modification examples may be configured to be stored in one or more computers connected to a network, such as the Internet, and downloaded via the network.

Further, the programs executed by the information processing apparatus 3 according to the above-described embodiment and the modification examples may be configured to be provided or distributed over a network, such as the Internet.

Further, the programs executed by the information processing apparatus 3 according to the above-described embodiment and the modification examples can be implemented as one or more modules including at least any of the functional units described above, and as the actual hardware configuration, the CPU reads and executes the programs from the above-described storage device or apparatus to load and implement the above-described functional units on the main storage device.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

What is claimed is:

1. An image-based determination apparatus, comprising:
   circuitry configured to
   receive at least one of first image data, output from one or more image capture apparatuses, and second image data, output from another device, the another device including an information processing apparatus that receives image data from an image capture apparatus, and the first image data and the second image data to be subjected to an image-based determination operation;
   control a display to display the at least one of the received first image data and the second image data;
   designate a detection area, to be subjected to the image-based determination operation, in a first display area being displayed on the display, the first display area configured to display the at least one of the first image data and the second image data; and
   perform the image-based determination operation on an image at the detection area in a second display area being displayed on the display, the second display area configured to display the at least one of the first image data and the second image data.

2. An image-based determination apparatus, comprising:
   circuitry configured to
   receive at least one of first image data, output from one or more image capture apparatuses, and second image data, output from another device, the first image data and the second image data to be subjected to an image-based determination operation;
   control a display to display the at least one of the received first image data and the second image data;
   designate a detection area, to be subjected to the image-based determination operation, in a first display area being displayed on the display, the first display area configured to display the at least one of the first image data and the second image data; and
   perform the image-based determination operation on an image at the detection area in a second display area being displayed on the display, the second display area configured to display the at least one of the first image data and the second image data;
   a memory configured to store the at least one of the received first image data and the second image data; and
   an input device, wherein
   the circuitry is further configured to generate a result of the image-based determination operation performed on the first image data and the second image data as an information list that is created using the first image data and the second image data stored in the memory, and
   in response to receiving an operation of selecting a particular date and time when a particular result was obtained by performing the image-based determination operation from the information list by operating the input device, the circuitry controls the display to display specific image data corresponding to the selected particular date and time by reading the specific image data from the memory, the specific image data selectable from the first image data and the second image data stored in the memory.

3. An image-based determination apparatus, comprising:
   circuitry configured to
   receive at least one of first image data, output from one or more image capture apparatuses, and second image data, output from another device, the first image data and the second image data to be subjected to an image-based determination operation;
   control a display to display the at least one of the received first image data and the second image data;
   designate a detection area, to be subjected to the image-based determination operation, in a first display area being displayed on the display, the first display area configured to display the at least one of the first image data and the second image data; and perform the image-based determination operation on an image at the detection area in a second display area being displayed on the display, the second display area configured to display the at least one of the first image data and the second image data, wherein the circuitry receives a part of image data of a screen image being displayed on a display disposed for the another device, or image data combining the part of the image data of the screen image.

4. The image-based determination apparatus according to claim 1, wherein the information processing apparatus is another image-based determination apparatus, the another device is a system including the another image-based determination apparatus that receives image data from one or more image capture apparatuses, compatible to the one or more image capture apparatuses connected to the image-based determination apparatus, and the circuitry receives the image data from the another image-based determination apparatus as the second image data.

5. The image-based determination apparatus according to claim 4, wherein the information processing apparatus is another image-based determination apparatus, and the another device includes the another image-based determination apparatus with a number of two or more connectable in multiple stages, each of the another image-based determination apparatus including the one or more image capture apparatuses, compatible to the one or more image capture apparatuses connected to the image-based determination apparatus.

6. The image-based determination apparatus according to claim 1, wherein the information processing apparatus is another image-based determination apparatus, the another device is a system including the another image-based determination apparatus, the another image-based determination apparatus includes an analog camera, a converter, and an information processing apparatus, image signals output from the analog camera are converted into digital image data by the converter, the digital image data being output from the information processing apparatus as the second image data, and the circuitry receives the second image data from the information processing apparatus.

7. The image-based determination apparatus according to claim 1, wherein the another device is a system including another image-based determination apparatus that includes the information processing apparatus configured to perform given analysis processing on image data captured by a movie image camera, and the circuitry receives, from the information processing apparatus, an image reflecting a result of the performed given analysis processing as the second image data, the second image data displayed on a display of the information processing apparatus included in the another image-based determination apparatus.

8. The image-based determination apparatus according to claim 1, wherein the information processing apparatus is configured to perform given analysis processing by executing an application, and the circuitry receives, from the information processing apparatus, an image reflecting a result of the performed given analysis processing as the second image data, the second image data displayed on a display of the information processing apparatus included in the another image-based determination apparatus.

9. The image-based determination apparatus according to claim 1, wherein the information processing apparatus is a wireless communication terminal configured to transmit at least a part of an image displayed on a display of the another device to the image-based determination apparatus using wireless communication, and the circuitry receives the at least the part of the image from the wireless communication terminal using wireless communication as the second image data.

10. The image-based determination apparatus according to claim 1, wherein the information processing apparatus is configured to generate and update a graph based on data generated by executing an application, and displays the graph on a display of the another device, and the circuitry receives, from the information processing apparatus, an image including the graph displayed on the display of the another device as the second image data.

11. The image-based determination apparatus according to claim 1, wherein the another device is a system including the image capture apparatus and the information processing apparatus, the image capture apparatus is configured to capture first captured image under one environmental condition and second captured image under another environmental condition, the information processing apparatus is configured to use a partial image of the first captured image captured under the one environmental condition to determine a conversion formula for converting a color of a partial image of the second captured image captured under the another environmental condition to a color of the partial image of the first captured image, the position of the partial image of the first captured image matching the position of the partial image of the second captured image, apply the conversion formula to the second captured image, and output the second captured image applied with the conversion formula, and the circuitry receives the second captured image applied with the conversion formula, output from the information processing apparatus, as the second image data.

12. An image-based determination system, comprising:

one or more image capture apparatuses configured to output first image data to be subjected to an image-based determination operation;

an image-based determination apparatus; and another device including an information processing apparatus configured to receive image data from an image capture apparatus, and output second image data to be subjected to the image-based determination operation, wherein the image-based determination apparatus includes circuitry configured to receive the at least one of the first image data, output from the one or more image capture apparatuses, and the second image data, output from the another device;

control a display to display the at least one of the received first image data and the second image data;

designate a detection area, to be subjected to the image-based determination operation, in a first display area being displayed on the display, the first display area configured to display the at least one of the first image data and the second image data; and perform the image-based determination operation on an image at the detection area in a second display area being displayed on the display, the second display area configured to display the at least one of the first image data and the second image data.

\* \* \* \* \*